United States Patent [19]

Dempsey et al.

[11] Patent Number: 5,282,200
[45] Date of Patent: Jan. 25, 1994

[54] RING NETWORK OVERHEAD HANDLING METHOD

[75] Inventors: Donald Dempsey, Grapevine; J. A. Crossett, Richardson, both of Tex.

[73] Assignee: Alcatel Network Systems, Inc., Richardson, Tex.

[21] Appl. No.: 986,262

[22] Filed: Dec. 7, 1992

[51] Int. Cl.⁵ .............................................. H04J 3/02
[52] U.S. Cl. ........................ 370/85.12; 370/110.1; 340/825.05
[58] Field of Search .................. 370/13, 14, 16, 16.1, 370/85.12, 85.13, 85.15, 110.1; 340/825.05; 371/11.1, 11.2

[56] References Cited

U.S. PATENT DOCUMENTS

| | | | |
|---|---|---|---|
| 4,593,154 | 6/1986 | Takeda et al. | 370/16.1 |
| 5,132,962 | 7/1992 | Hobgood et al. | 370/16.1 |
| 5,136,589 | 8/1992 | Konishi | 370/16.1 |
| 5,146,452 | 9/1992 | Pekarske | 370/13 |
| 5,150,356 | 9/1992 | Tsuksui | 370/16.1 |

*Primary Examiner*—Douglas W. Olms
*Assistant Examiner*—Ajit Patel
*Attorney, Agent, or Firm*—Bruce C. Lutz; Dennis O. Kraft

[57] ABSTRACT

A method and system for handling transport overhead on a ring network. The system includes a ring network having a plurality of network elements communicating a signal along the network. In one embodiment, a method is provided for restoring transport overhead along the ring network. This method includes designating a first of the plurality of network elements as a master network element and inserting a first transport overhead break on the ring network by the master network element. The method further includes detecting a failure of the signal by a second network element and inserting a second transport overhead break on the ring network by the second network element in response to the detection of a failure. Finally, the method includes removing the second transport overhead break under the direction of said master network element. Another method of restoring transport overhead is disclosed which also includes the steps of designating a first of the plurality of network elements as a master network element and detecting a failure of the signal by a second network element. In addition, the method includes the step of transmitting a count to the master network element by the second network element in response to the step of detecting a failure. In addition, the count is incremented each time it passes through a network element other than the first and second network elements. Finally, the count is received by the master network element.

17 Claims, 14 Drawing Sheets

RING NETWORK OVERHEAD HANDLING METHOD

This invention is in the field of telecommunications, and is more particularly directed to a method of managing ring network overhead transport during network failure conditions and subsequent restoration.

BACKGROUND OF THE INVENTION

Advances in the telecommunications industry have caused improvements in virtually every aspect of telecommunication links. For example, fiber optic technology has enjoyed rapid advancement and implementation, and appears to provide benefits which will be realized into the next century. Digitization of communications permits increased performance at lower costs using integrated circuits. Less noise, lower signal to noise ratio requirements, and lower error rates are additional advantages. Another example, and one which often uses fiber optic technology, is the implementation of digital telecommunication rings. In these rings, communication occurs between various network elements along the ring. These rings are beneficial because rings of virtually any length are practical. Moreover, rings add reliability to the communication between the various network elements along the ring.

With the advancement of communication rings, various regulatory agencies and specifications are developing. For example, as is known in the telecommunications art, the synchronous optical network (SONET) is the new ANSI standard for advanced fiber optic transmission. SONET has for the first time defined a standard optical interface which allows so-called "midspan" meets, that is, interfaces between equipment produced by different manufacturers. This standard has particular application to the present invention in that it describes common generic criteria for optical ring networks.

As is known in the art, network elements (NEs) communicate around a ring by passage of information frames. Under SONET, entire communication streams do not have to be torn apart and reassembled every time a signal is added or dropped in a SONET network. Instead, they are collected and routed within a level 1 synchronous transport signal (STS-1) frame. FIG. 1 illustrates an STS-1 frame. The STS-1 frame consists of 90 columns and 9 rows of 8-bit bytes (shown as "B"), for a total of 810 bytes (6480 bits). Typically, the STS-1 frame has a length of 125 microseconds (i.e., 8,000 frames per second). The bytes of the STS-1 frame are transmitted in a row-by-row fashion from right to left. Further, for each byte, the most significant bit is transmitted first. Note also that multiple STS-1s may be synchronously multiplexed into higher rate STS-N signals. STS-N signals are converted to optical OC-N signals for transport through fiber optic media.

The first three columns of the STS-1 frame are designated the transport overhead. The transport overhead contains overhead bytes of both section overhead and line overhead. Under current standards, twenty-seven bytes are assigned for transport overhead, with nine bytes of section overhead and eighteen bytes of line overhead. The section overhead deals with the transportation of an STS-N frame across the physical layer or physical media of the ring. Functions of this section overhead include framing, scrambling, section error monitoring, and communicating section level overhead.

The line layer provides synchronization and multiplexing functions for the path layer (the path layer deals with the transport of network services between SONET terminal multiplexing equipment). The line overhead associated with these functions includes overhead for maintenance and protection purposes.

As also known in the art, SONET functionally specifies particular bytes in the section and line transport overhead. These bytes are also referred to in the art as defining "channels". FIG. 2 generally illustrates these bytes with the letter designations given by SONET. While the position of each byte is specified by SONET, the functionality of various bits or even complete bytes for particular designations remain unspecified for certain applications. For example, and as set forth in greater detail below, the K1 line overhead byte has no current specification for unidirectional rings. As another example, bits 3–5 (with bit 1 being the most significant bit) of the K2 line overhead byte are likewise unspecified by SONET for unidirectional rings. For other definitions and descriptions of the transport overhead bytes, the reader is referred to *Synchronous Optical Network (SONET) Transport Systems: Common Generic Criteria*, Technical Reference TR-NWT-000253, Issue 2, December 1991, published by Bellcore, and incorporated herein by reference.

Returning to FIG. 1, the remaining 87 columns of the STS-1 frame are the STS-1 envelope capacity. Within the STS-1 envelope capacity is placed a synchronous payload envelope (SPE). One column of the SPE contains nine bytes, designated as STS path overhead. This column may be located at any column within the STS-1 envelope capacity. The remaining 774 bytes are available for payload. The STS-1 SPE may begin anywhere in the STS envelope capacity. Typically, it begins in one frame and ends in the next. The STS-1 SPE may, however, be wholly contained in one frame. STS path overhead is associated with each payload and is used to communicate functions from the point where service is mapped into the STS SPE to where it is delivered.

FIG. 3 illustrates a simplified block diagram to delineate various definitions of the transmission network that interconnect various SONET NEs. Specifically, the SONET line, section and path are shown. FIG. 3 further illustrates path terminating equipment 10 and 12, line terminating equipment 14 and 16, and section "terminating" equipment 18 and 20. As known in the art, an NE is said to be terminating if it is specified that during normal operations, the device may alter the corresponding information associated with it. For example, path terminating equipment 10 and 12 are defined to be equipment which are permitted to alter the path portion of the SONET frame (see FIG. 1). Line terminating equipment 14 and 16 are specified so that they are permitted to alter the line information of the SONET frame. Finally, section terminating equipment 18 and 20 are specified so that they may alter the section information of the SONET frame.

An example of STS-1 SPE path terminating equipment is an add/drop multiplexer. An add/drop multiplexer is also line terminating. Finally, an example of section terminating equipment is a repeater. Note that a device specified as capable of terminating one category of information necessarily can terminate subset categories. Thus, path terminating equipment 10 and 12 may also terminate line and section information. Further, line terminating equipment 14 and 16 may also terminate section information. Note also that the termination specifications apply only during normal operations. For example, while a repeater is section terminating, during a failure it may alter other information such as the K1 and K2 line overhead bytes.

Given the terms and standards set forth above, note that currently no specification exists for restoring the transport overhead information (outside of the DCC) in a SONET ring network. Given the broad base possibility for incompatibilities at a mid-span interface, it is important to develop a standard method for control of the frame transport overhead. Specifically, it is highly beneficial to develop a system whereby transport overhead is accounted for during a failure along the ring network. By maintaining part or all of the transport overhead operational during a system failure, it is possible to use the transport overhead to help identify the failure for purposes of having it corrected in an expedited manner. Moreover, once the network is repaired, it is also important to restore the transport overhead in an organized and efficient manner.

As known in the art, improper restoration of the transport overhead channel in the ring network may cause an oscillatory action to occur along the network. Such oscillation may occur when the ring becomes "closed" as to transport, that is, having no barrier to prevent the transport overhead from continuously encircling the ring. This unimpeded travel allows an NE to add transport overhead to the ring, and subsequently receive back the same overhead, in addition to any accumulated overhead added by other NEs. This cumulative feedback around the ring may provide undesirable results. For example, for audio transport overhead, such undesirable effects may include high level audio feedback which is received by any NE monitoring the ring.

FIG. 4a illustrates a block diagram of a prior art telecommunications ring network 22. According to this example, ring network 22 is a unidirectional path protection switched (PPS) telecommunications ring network. A unidirectional ring, as known in the art, is one in which traffic generally travels in one medium and direction between elements along the ring, while concurrently flowing in a redundant manner in an opposite direction in another medium. Note also that transport overhead, as opposed to traffic, is communicated bidirectionally between NEs on a unidirectional ring. Ring network 22 includes a first ring 24 and a second ring 26. As illustrated, traffic flow around first ring 24 is clockwise, while traffic flow around second ring 26 is counterclockwise. Further, both rings 24 and 26 traverse through various NEs positioned along the ring. In the example of FIG. 3a, four NEs are provided and are designated with corresponding numerals (e.g., NE0, NE1, NE2 and NE3).

Typically, one of rings 24 or 26 is predetermined as the primary communication medium for traffic flow around the ring. For example, consider first ring 24 as this predetermined ring. As a result, communication between any of the NEs along the ring is, under normal operating conditions, in a clockwise fashion. For each communication, however, a redundant signal is provided along second ring 26 in a counterclockwise fashion. As is known in the art, this redundant signal permits the network element to select between the primary and redundant signals according to the transport performance information received by the corresponding NE.

FIG. 4b illustrates network ring 22 of FIG. 4a, with the additional indication that NE0 has implemented an "artificial transport overhead break" 28. Such an implementation of a transport overhead break is known in the art for preventing ring network 22 from becoming a closed ring. Without overhead break 28, transport overhead would be permitted to continue uninterrupted around the entirety of ring 22 and, hence, could cause the undesirable accumulation and feedback effects discussed above. The inclusion of transport overhead break 28, however, acts as a barrier so that the transport overhead is not accepted from what is illustrated as the right side of NE0. Thus, the effect of the overhead break 28 is to prevent the transport overhead from fully encircling the ring and, consequently, also to prevent undesirable cumulative feedback effects.

FIG. 4c illustrates a block diagram of the effective communication path for the transport overhead caused by the artificial transport overhead break 28 illustrated in FIG. 4b. As shown, the direct line of transport overhead communication between NE0 and NE3 is effectively severed by artificial transport overhead break 28. As a result, any transport overhead communication between these two NEs must be communicated through NE1 and NE2. Nonetheless, transport overhead communication is still permitted between each NE of the ring, without the possibility of cumulative feedback.

FIG. 4d illustrates ring network 22 of FIG. 4a, wherein both rings 24 and 26 have been severed (illustrated by an "X" on rings 24 and 26). The severance may occur due to a physical disturbance of rings 24 and 26, or like situation. In any instance, as known in the art, the NEs along the rings include circuitry for detecting the loss of an incoming signal. When a signal loss occurs, a detecting NE inserts an "actual" transport overhead break on the side of the NE which would receive the signal if it existed. An actual overhead break is to be contrasted with an artificial overhead break. The former occurs upon detection of an actual fault with the ring or one of its components. The latter is imposed, as discussed above, to create a break in transport overhead communications during normal operations of the ring network. Note also that, during an artificial break, the NE imposing the break may evaluate the transport overhead. It does not, however, transmit the overhead to the using application, or pass it through to the remainder of the network.

As an example of an actual overhead break, ring network 22 is shown with an actual failure between NE2 and NE3. In response to the failure, NE2 and NE3 detect a loss of signal along rings 26 and 24, respectively. Upon detection of this signal loss, both NE2 and NE3 force an actual transport overhead break 30 and 32, respectively, on their corresponding sides detecting the failure. Overhead breaks 30 and 32 function in the same manner as artificial overhead break 28 associated with NE0. Thus, breaks 30 and 32 preclude transport overhead information received by NE2 from transmitting along ring 24 toward NE3. Similarly, overhead break 32 prevents overhead information received by NE3 from transmitting along ring 26 toward NE2.

FIG. 4e illustrates the effective communication path for the transport overhead of network ring 22. Note that overhead breaks 28, 30 and 32 act in combination to segment or isolate NE3 from the remainder of the NEs of ring 22. Thus, before restoring the ring or making any provision for this condition, NE3 cannot communicate transport overhead with the remainder of the ring network. Clearly, such a result is undesirable because the lack of overhead communication to NE3 prevents using that information to help troubleshoot the fault which has occurred along the ring network. In addition, no current standards exist for handling the transport overhead channels in a SONET ring upon the imposition of an actual overhead break. Indeed, in some prior art systems, the ring network is simply left in its segmented form, with no restoration of transport overhead to the segmented NE or NEs. One key object of the present invention, as more readily appreciated below, is to maintain a constant communication path between all NEs despite a fault along one of the rings (for example, as shown in FIG. 4c).

One known solution for attempting to restore transport overhead is implemented in the LTS-21130 ring network, formerly owned and sold by Rockwell and currently owned by Alcatel. The LTS-21130, however, is dependent on a strict hardware implementation. In this implementation, a "home node" initially imposes an artificial transport overhead break. Thereafter, an NE along the ring, when detecting a loss of signal, inserts a transport overhead break in the direction of the loss of signal. Upon correction of the break, the detecting NE immediately removes its overhead break. In addition, the detecting node transmits an indication bit and the newly received signal toward the home node. The home node, upon receiving the forwarded information, reinserts its overhead break. Prior to receiving this new information, however, the ring is a closed ring, that is, no overhead break exists on the ring and, therefore, cumulative overhead feedback may occur. Indeed, specific dedicated hardware is included in the home node so that it can quickly reinsert its overhead break before the effects of cumulative overhead feedback become overwhelming.

Thus, in the LTS-21130, additional specific hardware is necessary for quick switching so that the home node can insert its overhead break prior to permitting an immense amount of cumulative feedback to occur. Further, this restoration process is not predictable because the speed of the restoration relies strictly on the speed of the hardware. In contemporary networks, however, software, rather than hardware, is commonly used to manage the network. Moreover, the primary consideration during a failure along the ring is to restore traffic, rather than overhead. Such software restoration processes are well known in the art. Thus, in a software based environment, the scheme of the LTS-21130 is impractical because: (1) the use of dedicated hardware is undesirable; and (2) the speed required to implement the scheme is unavailable because the software is initially appointed to reestablishing traffic, rather than overhead around the ring. In contrast, the present invention provides a deterministic (i.e., predictable and uniform in result) method in which the reinsertion of an overhead break is ensured to occur prior to the release of the break elsewhere in the ring. Thus, the ring is never fully closed to overhead, thereby preventing cumulative feedback from occurring. Further, the present invention is preferably embodied in software, rather than dedicated hardware.

It is therefore an object of the invention to provide a method and system for restoring some or all of the transport overhead channels in a SONET ring.

It is a further object of the present invention to provide such a method and system which is useful in both SONET unidirectional and bidirectional rings.

It is a further object of the present invention to provide such a method and system to prevent oscillatory action around the network ring due to cumulative feedback of the transport overhead channels.

It is a further object of the present invention to provide such a method and system for providing a deterministic method to restore the overhead channels of a network ring.

It is a further object of the present invention to provide such a method and system such that there are no requirements as to how the NEs are distributed in the network ring while still having the ability to detect and restore the network transport overhead channels.

It is a further object of the present invention to provide such a method and system which does not require knowledge of the network topology other than the type of ring operation (i.e., unidirectional or bidirectional) and which path terminating device is the ring master.

It is a further object of the present invention to provide such a method and system such that overhead operations do not interfere with or delay traffic protection.

Still other objects and advantages of the present invention will become apparent to those of ordinary skill in the art having reference to the following specification together with its drawings.

SUMMARY OF THE INVENTION

One embodiment of the present invention provides a method of restoring transport overhead along a ring network having a plurality of network elements communicating a signal on the ring network. This method includes designating a first of the plurality of network elements as a master network element and inserting a first transport overhead break on the ring network by the master network element. The method further includes detecting a failure of the signal by a second network element and inserting a second transport overhead break on the ring network by the second network element in response to the detection of a failure. Finally, the method includes removing the second transport overhead break under the direction of said master network element.

Another embodiment of the present invention also includes a method of restoring transport overhead along a ring network having a plurality of network elements communicating a signal on the ring network. This method also includes the steps of designating a first of the plurality of network elements as a master network element and detecting a failure of the signal by a second network element. In addition, the method includes the step of transmitting a count to the master network element by the second network element in response to the step of detecting a failure. In addition, the count is incremented each time it passes through a network element other than the first and second network elements. Finally, the count is received by the master network element.

In yet another embodiment of the method for restoring transport overhead, the present invention includes detecting a failure of the signal by one of said plurality of network elements followed by initially restoring traffic along the ring network via software communication between the plurality of network elements. Thereafter, transport overhead is subsequently restored along the ring network via software control between the plurality of network elements.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6a-1 and 6a-2 illustrate a flow chart of the preferred method and system of the present invention;

DETAILED DESCRIPTION OF THE INVENTION

The preferred embodiment of the present invention and its advantages are best understood by referring to FIGS. 5a through 11b of the drawings, like numerals being used for like and corresponding parts of the various drawings.

Figure 4A:
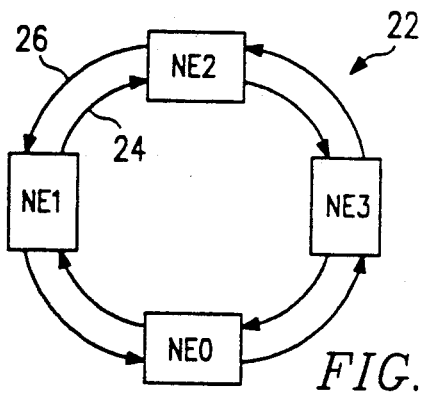
FIG. 4a illustrates a block diagram of a telecommunications ring network.
Figure 4B:
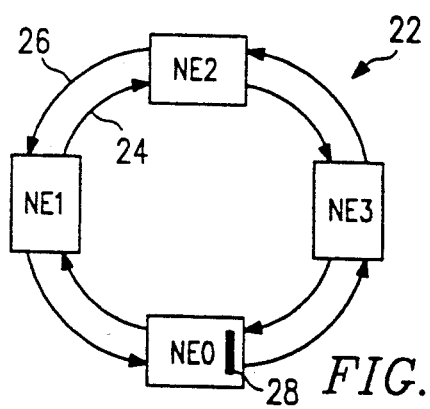
FIG. 4b illustrates the normal ring network of FIG. 4a with an artificial transport overhead break.
Figure 4C:
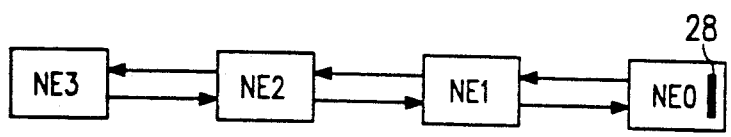
FIG. 4c illustrates the resultant communication configuration of the ring network of FIG. 4b.
Figure 4D:
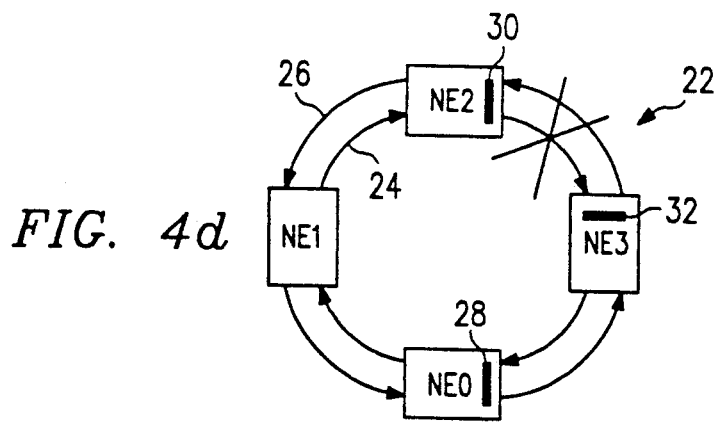
FIG. 4d illustrates the ring network of FIG. 4a with ring faults and actual transport overhead breaks.
Figure 4E:
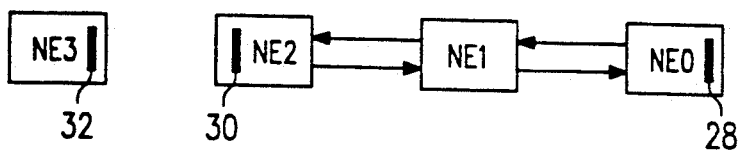
FIG. 4e illustrates the resultant communication configuration of the ring network of FIG. 4d.
Figure 5A:
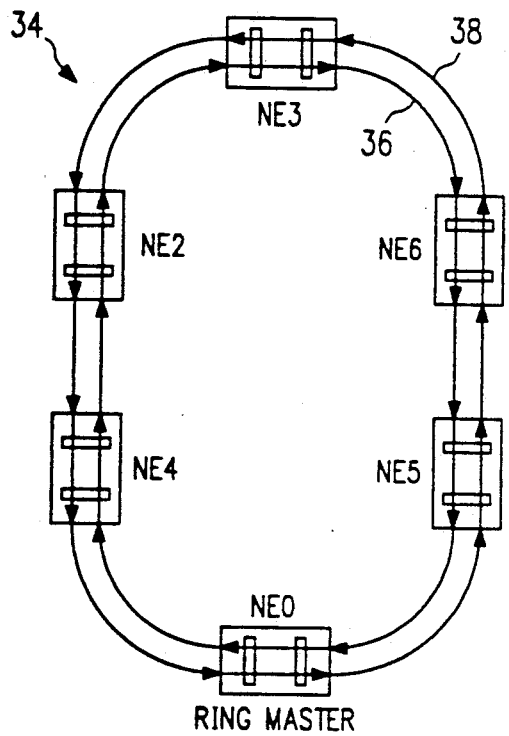
FIG. 5a illustrates an electrical diagram, in block form, of an exemplary ring network for using the present invention.

FIG. 5a is an electrical diagram, in block form, of a telecommunication ring network 34 in which the preferred embodiments of the invention may be used. Ring network 34, in the preferred embodiment, is a unidirectional ring including a first ring 36 and a second ring 38. For purposes of illustration, ring network 34 includes six NEs, but this in no manner should be construed as limiting the present invention. Indeed, as described in greater detail below, the present invention provides a method whereby the number of NEs along network ring 34 is extremely flexible. The six NEs around network ring 34 are arbitrarily designated, in clockwise fashion, NE0, NE4, NE2, NE3, NE6 and NE5. Note that the NEs are numbered for discussion only and, in fact, are generally indistinguishable from one another for purposes of this invention. For illustration purposes, each NE includes two transport overhead break indicators (shown as blank rectangles) connected in-line for both rings 36 and 38. As illustrated in greater detail below, a corresponding overhead break indicator is darkened to illustrate the instance where an NE inserts an overhead break in place. As stated in connection with FIGS. 4d-e above, the overhead break prevents transport overhead communication from the direction of the break.

Figure 5B:
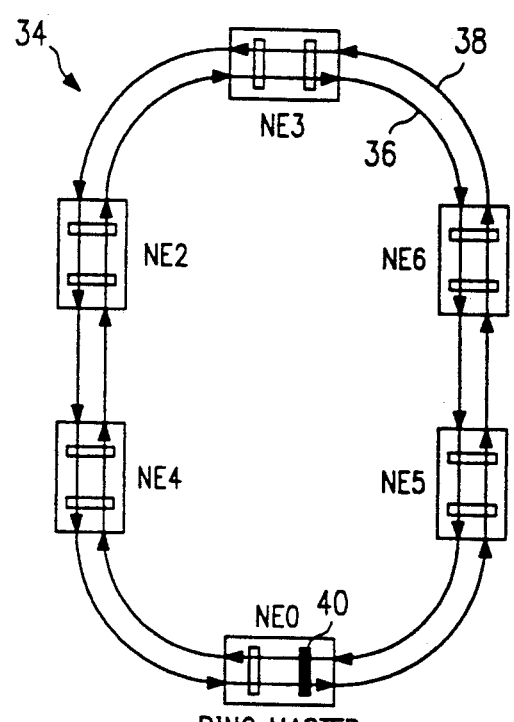
FIG. 5b illustrates the ring network of FIG. 5a having an artificial transport overhead break inserted at a master NE.

FIG. 5b illustrates ring network 34 during its normal operation. NE0 is designated a ring master. The master designation distinguishes the particular NE from all other NEs as more readily apparent below. Any NE within network ring 34 may be designated ring master and, therefore, its application to NE0 is arbitrary. In the preferred embodiment, the master NE is a path terminating NE. Further, the designation of master is provided in software and preferably stored in non-volatile memory which also includes various other network information.

The master NE (NE0 in the current example) forces an artificial transport overhead break 40 during normal operation of ring network 34. As discussed above in connection with FIG. 4b, this artificial break prevents cumulative feedback of transport overhead during normal operating conditions. Thus, transport overhead communication cannot directly occur between NE0 and NE5; rather, such communication must pass through the intermediate NEs between the two (i.e., NE4, NE2, NE3 and NE6). In the meantime, traffic information is undisturbed by artificial overhead break 40 and passes along first ring 36 or second ring 38 in accordance with standard unidirectional ring protocol.

Figure 5C:
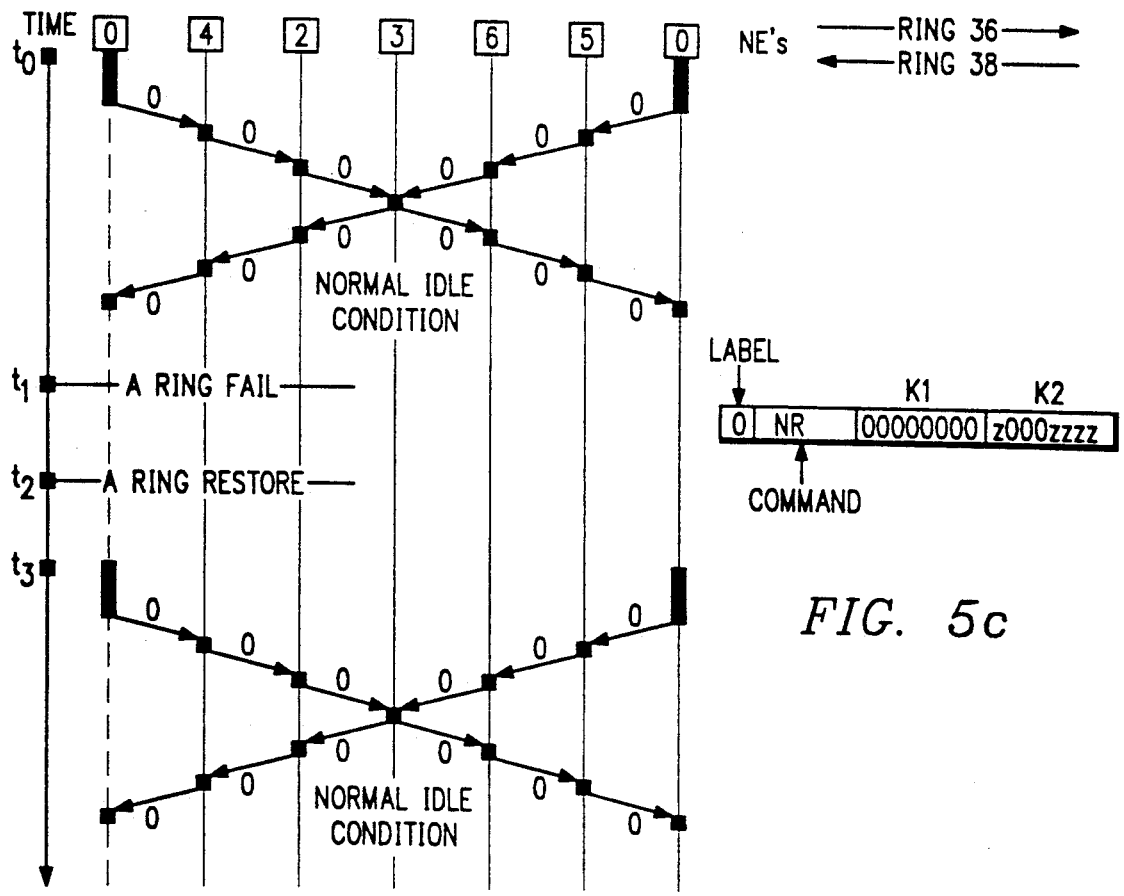
FIG. 5c illustrates a timing message chart for the normal operations of the ring network of FIG. 5b.

FIG. 5c illustrates a timing message chart of transport overhead along first and second rings 36 and 38 in FIG. 5b. Each individual NE is shown across the top of the diagram. The flow from left to right illustrates the clockwise travel of transport overhead along ring 36. Similarly, the flow from right to left illustrates the counterclockwise travel of transport overhead along ring 38. The vertical axis of FIG. 5c illustrates time from an initial operating point, $t_0$, toward various subsequent events discussed below. The present invention uses a novel system including commands to maintain and restore the transport overhead channels in network ring 34. A numeric label above the direction arrow between each sequential NE around ring 34 identifies which of the particular commands is being transmitted. The label and corresponding command are shown in the legend at the right of the timing message chart. For example, with reference to FIG. 5c, the label of "0" illustrates a no request command (i.e., NR) indicating that the network is in a normal idle condition.

Figures 1, 2:
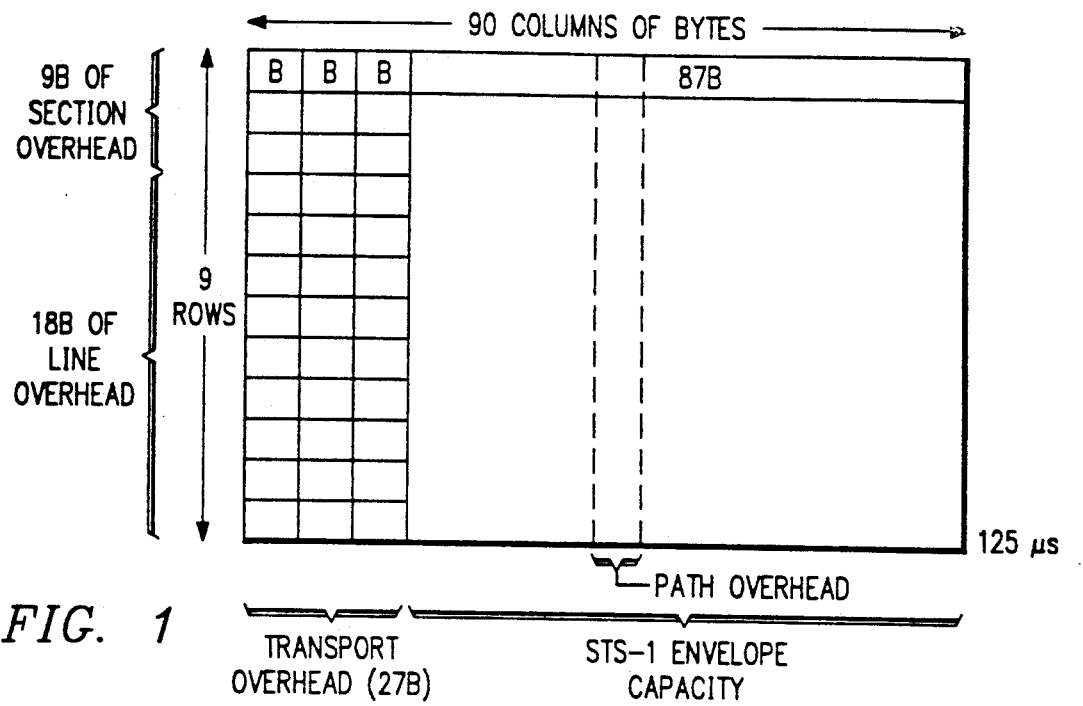
FIG. 1 illustrates an STS-1 frame.
FIG. 2 illustrates the transport overhead bytes in an STS-1 frame.
Figure 3:
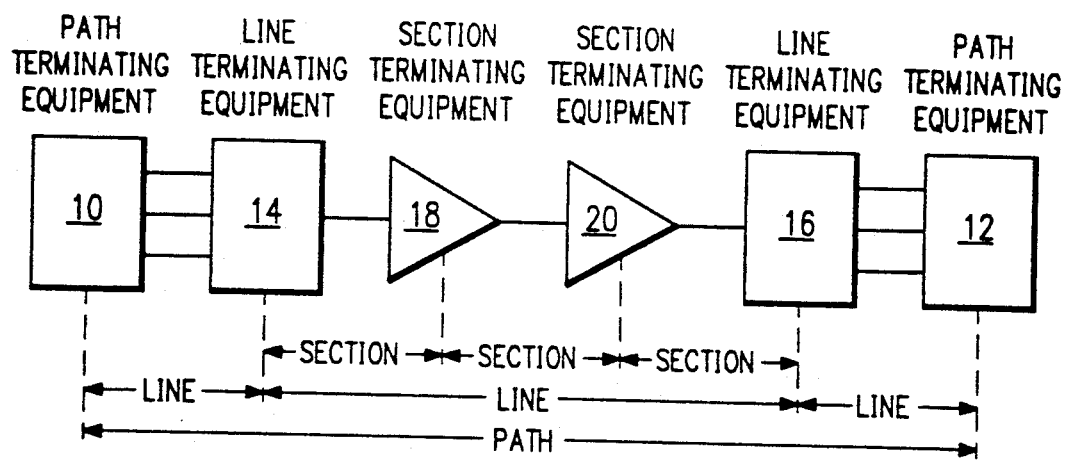
FIG. 3 illustrates various network elements terminating the frame line, section and path information.

The legend in FIG. 5c also includes an indication of the K1 and K2 transport overhead line bytes (see also, FIG. 2). As described in greater detail below, these bytes are used in the preferred embodiment to transmit a count and command signal, respectively. In the preferred embodiment, the K1 transport line overhead byte is used to communicate a numeric count for implementing this scheme. The K1 byte was selected because none of its eight bits are currently defined for use in a unidirectional ring network. As a result, it is capable of providing a count up to 255 (i.e., $2^8 - 1 = 255$) which provides significant advantages described below. Moreover, current ring network elements typically include the necessary processing capability for decoding the K1 channel and, hence, the present invention may be implemented with no additional hardware necessary for such a function.

Also as described in greater detail below, certain bits of the K2 byte are used to encode the particular commands of the present invention. This channel was selected as preferable because its bits 2-4 are undefined for a unidirectional ring, and those bits are adequate to indicate the various commands described below. Because only bits 2-4 of the K2 byte are used, the remainder of those bits are irrelevant for purposes of the present invention. Thus, these bits are shown as "z" in the legend (and Table 1) accompanying the timing message chart of FIG. 5c as well as the other timing message charts discussed below. Note also, as is the case for K1, current ring networks already include the necessary processing capability for decoding the K2 channel as well. In the preferred embodiment, three commands are encoded by the K2 byte. These commands are shown in Table 1, below.

TABLE 1

| K2 byte | Command | Abbreviation |
| --- | --- | --- |
| z000zzzz | No Request | NR |
| z011zzzz | Signal Failure | SF |
| z101zzzz | Wait to Restore | WTR |

The particular functions of each command and their use are described in greater detail below.

As an example in reading FIG. 5c, the Figure illustrates that at time, $t_0$, NE0 transmits a no request command to NE4 along ring 36. Concurrently, NE0 transmits a no request command to NE5 along ring 38. During normal idle conditions, each receiving NE (i.e., NE4 on ring 36 and NE5 on ring 38) transfers the command onward along its corresponding ring.

FIG. 5c also illustrates that at a time, $t_1$, a failure occurs along the ring. Specific examples of responding to a ring failure in accordance with the present invention are shown in connection with FIGS. 6a-11b. FIG. 5c also shows a time, $t_2$, at which the ring network is restored. Restoration occurs when the failure along the ring has been cured and transport overhead communications are restored to normal operating conditions. These normal conditions commence at a time, $t_3$, and, therefore, operation continues in the same manner as illustrated from time, $t_0$.

Figures 1, 6A:
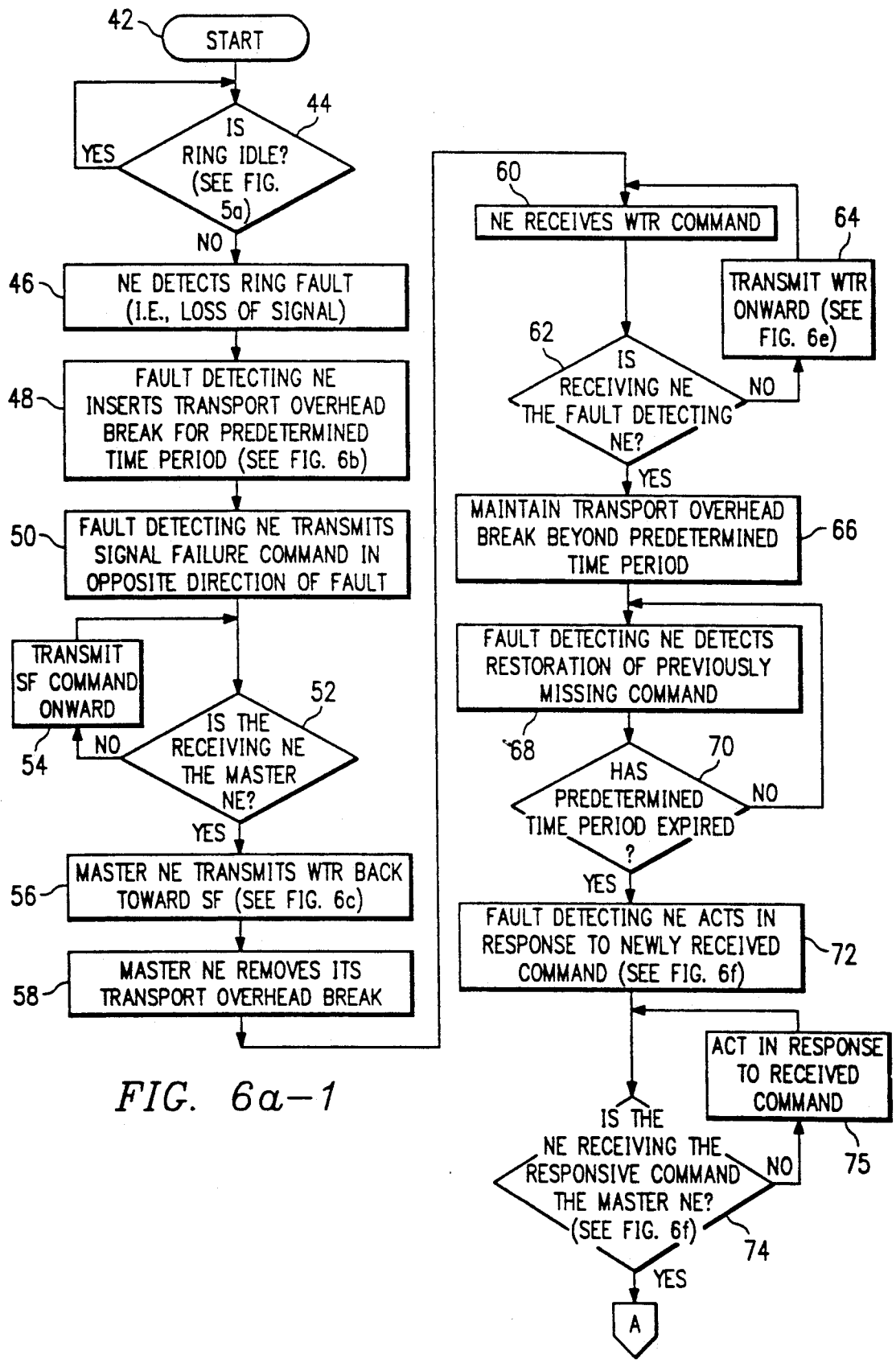
Figures 2, 6A:
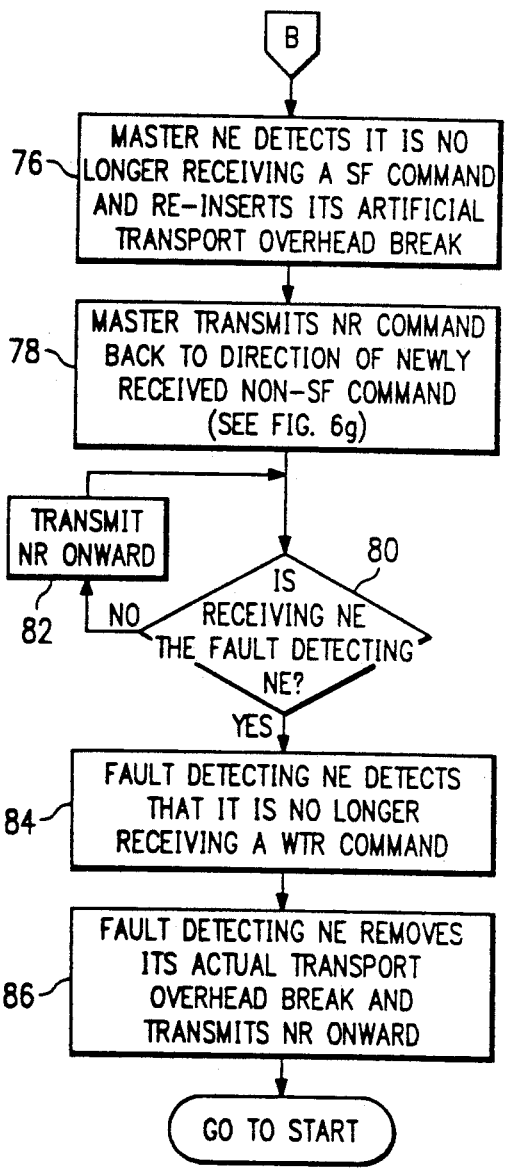
Figure 6B:
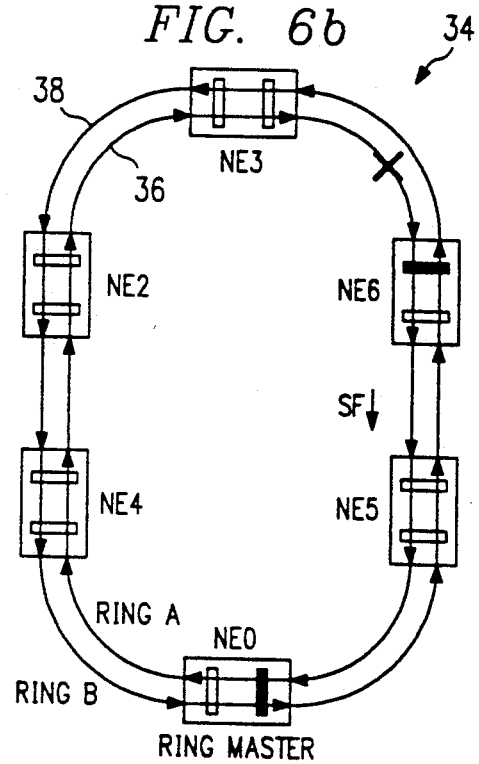
FIG. 6b illustrates the ring network of FIG. 5a having a fault (fiber break) and responsive actual transport overhead break.
Figure 6C:
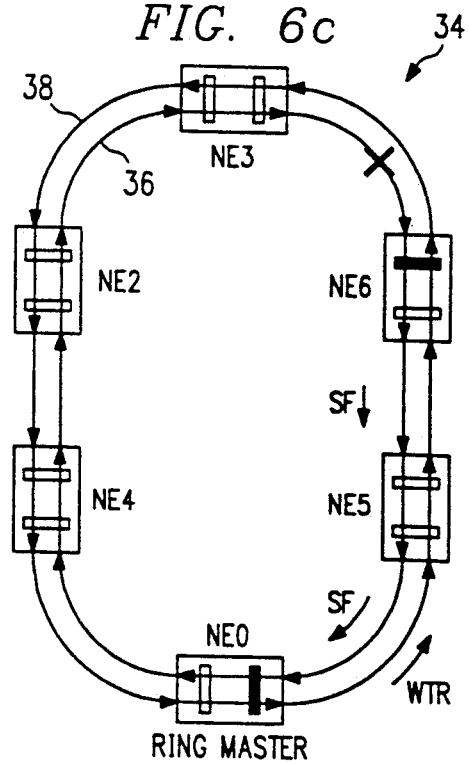
FIG. 6c illustrates the ring network of FIG. 6b following the transmission of a wait to restore command by the master NE.
Figure 6D:
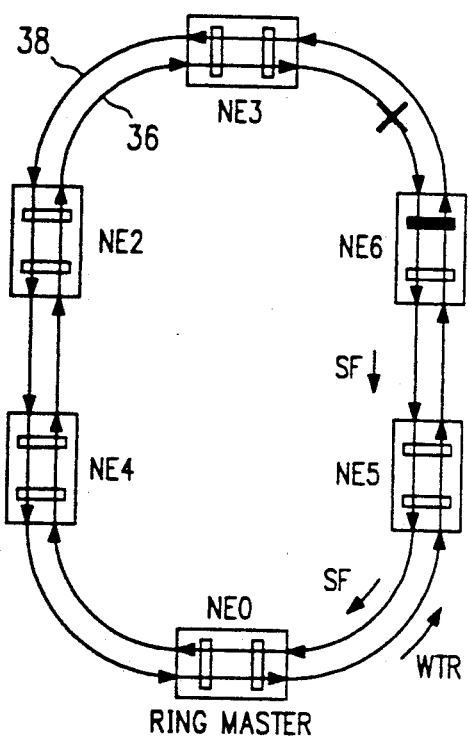
FIG. 6d illustrates the ring network of FIG. 6c following the removal of the artificial transport overhead break by the master NE.
Figure 6E:
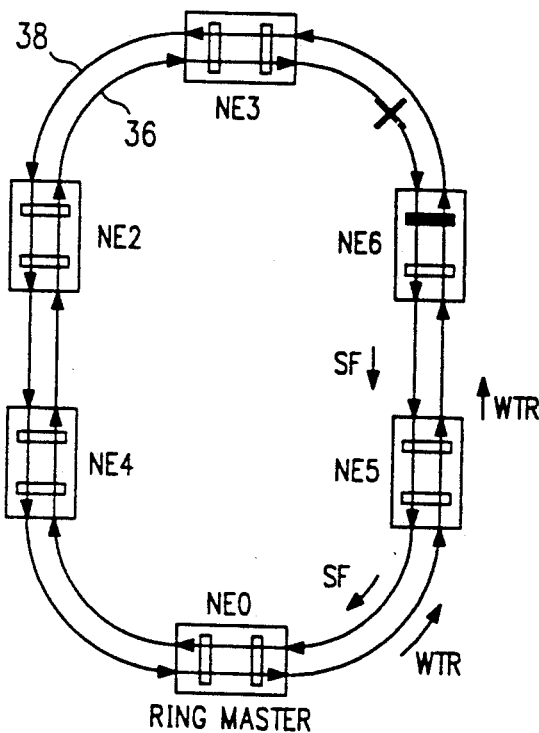
FIG. 6e illustrates the ring network of FIG. 6d following the transmission of the wait to restore command from NE5 to NE6.
Figure 6F:
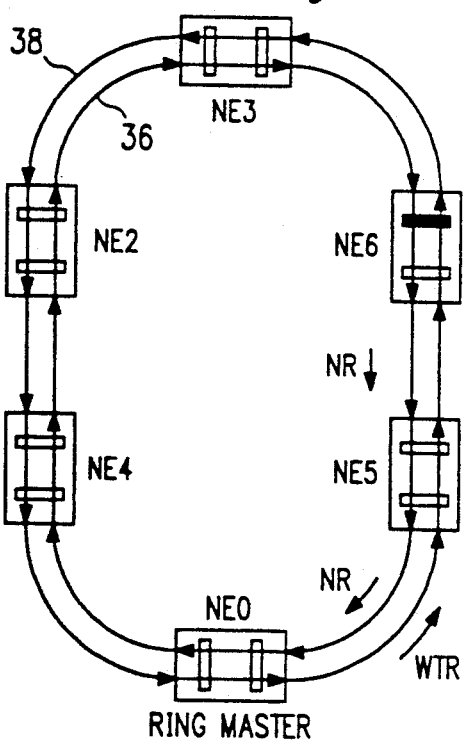
FIG. 6f illustrates the ring network of FIG. 6e following the transmission of a no request command from the fault detecting NE back to the master NE.
Figure 6G:
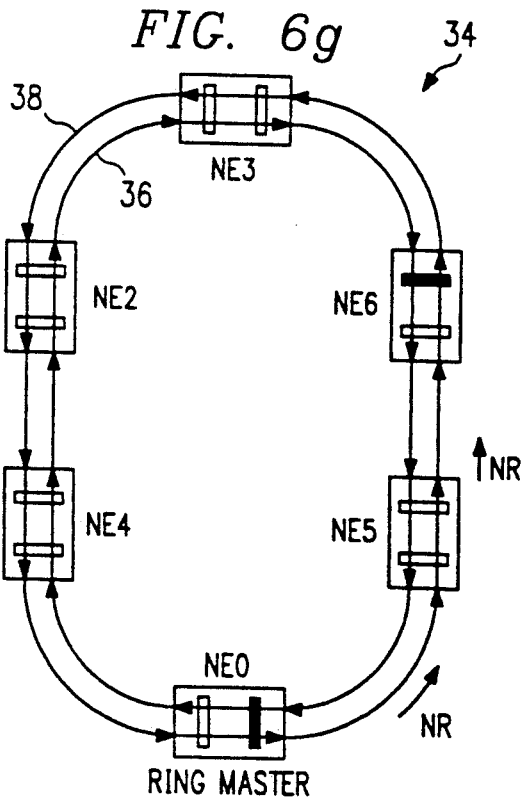
FIG. 6g illustrates the ring network of FIG. 6f following the reinsertion of the artificial transport overhead break by the master NE.
Figure 6H:
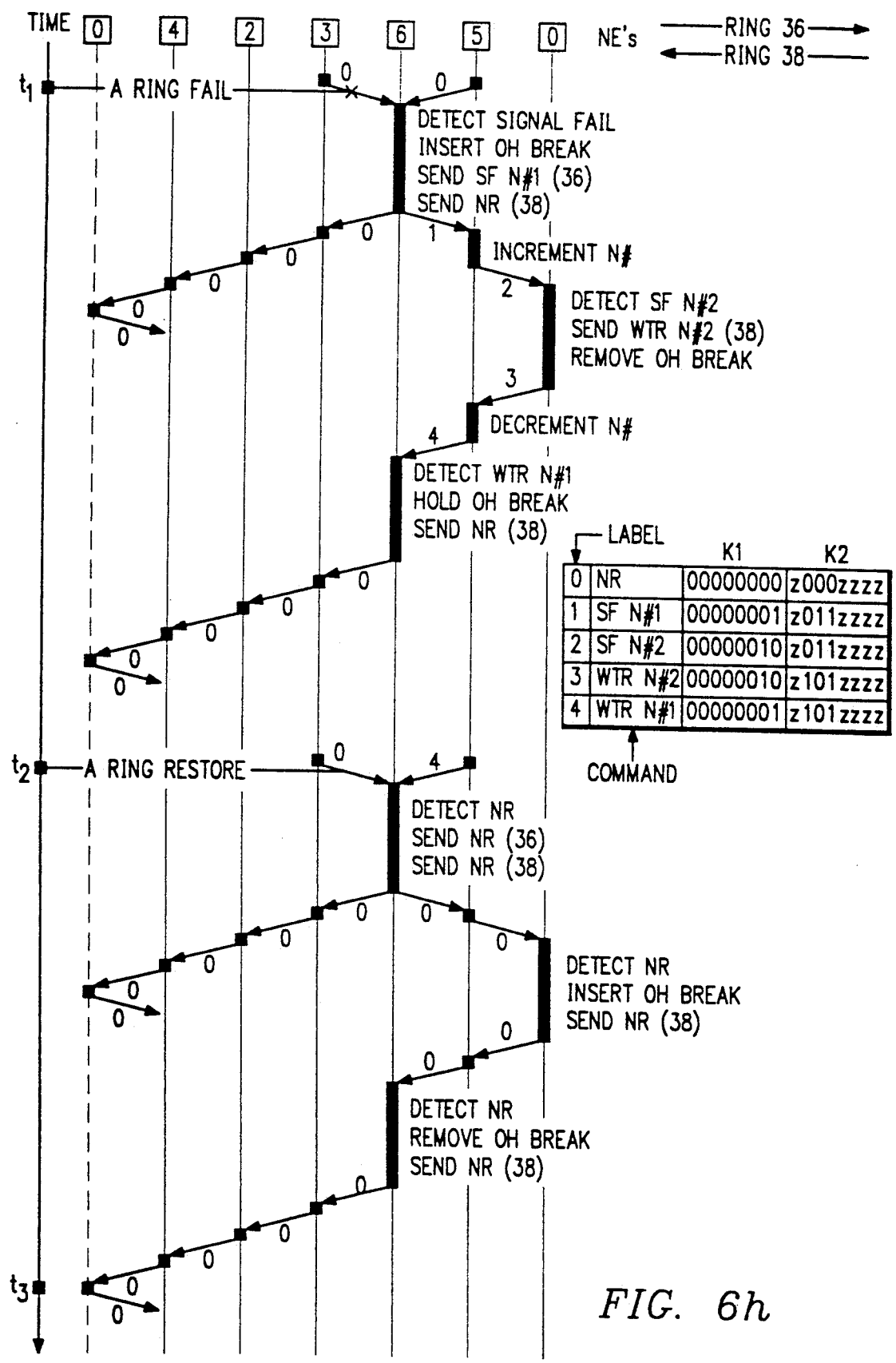
FIG. 6h illustrates a timing message chart of the sequence of events depicted in FIGS. 6a-6g.

FIGS. 6a-1 and 6a-2, along with FIGS. 5a and 6b-6h, illustrate one aspect of the preferred method and system of the present invention. Specifically, FIGS. 6a-1 and 6a-2 illustrate a flow chart, FIGS. 5a and 6b-6g illustrate block diagrams, and FIG. 6h illustrates a timing message chart, of the various steps of the inventive method and system. With reference to FIG. 6a-1, a start step 42 is shown at the commencement of the inventive method. After start step 42, a conditional step 44 determines whether ring 34 is idle (as shown in FIG. 5a). If so, control returns to conditional step 44 until the ring is no longer idle. Once the ring is no longer idle, control passes to an operational step 46. In operational step 46, an NE along ring network 32 detects a loss of signal. For example, as shown in FIG. 6b, NE6 detects a fault (indicated as an "X") in the transport overhead communications along ring 36. For purposes of this document, the NE detecting the fault is hereinafter referred to as a "fault detecting NE".

In operational stp 48, the fault detecting NE (i.e., NE6) inserts a transport overhead break on the side of the ring failure. This step is shown as a darkened rectangle in FIG. 6b on the side of NE6 detecting the fault. This overhead break is maintained for a predetermined period of time which, in the preferred embodiment is ten seconds. This predetermined time period acts as an interim guarantee that the fault detecting NE will not remove its transport overhead break until it is directed to do so by the master NE. For example, if the faulty signal were restored and no time period were imposed, the fault detecting NE would detect the restored signal and immediately remove its transport overhead break. If this occurred, the ring would be closed and, hence, cumulative feedback could occur. As described in greater detail below, however, the present invention permits the fault detecting NE to remove its break only under the direction of the master NE. Thus, the predetermined time period is set large enough to force the fault detecting NE to maintain its break while the master NE gains control over the restoration process. Note also that while the time period implementation is preferred, an alternative, such as a latching function could be used as an alternative.

In operational step 50, the fault detecting NE transmits a signal failure command in the direction opposite from the fault and along the same ring on which the fault is detected. Thus, referring to FIG. 6b, NE6 transmits a signal failure (SF) command toward NE5 along first ring 36. As the signal fault command continues along ring 36, it may encounter NEs intermediate between the fault detecting NE and the master NE. This possibility is addressed in conditional step 52 of FIG. 6a-1. Step 52 determines whether the NE receiving the signal fault command is the master NE. If not, operational step 54 passes the signal fault command onward toward the next NE and away from the fault within ring 36. If, on the other hand, the NE receiving the failure signal is the master NE, the master NE responds as shown in operational step 56.

In step 56, the master NE transmits a wait to restore command back in the direction from which it received the signal fault command. Thus, FIG. 6c illustrates the ring master NE0 transmitting a wait to restore (WTR) command along second ring 38 in the direction in which it received the signal failure command. The process continues to operational step 58 wherein the ring master (i.e., NE0) removes its artificial transport overhead break as illustrated in FIG. 6d. Once the artificial overhead break from NE0 is removed, ring 34 includes only a single transport overhead break, that is, the overhead break imposed by the fault detecting NE (i.e., NE6). As discussed above in connection with FIGS. 4b-c, the implementation of a single overhead break within the ring permits overhead communication between each of the ring NEs and, therefore, does not isolate individual NEs from overhead communication.

Returning to FIG. 6a-1, the process continues to operational step 60. In operational step 60, an NE along ring 38 receives the WTR command transmitted by the ring master. Upon receipt of the WTR command, a conditional step 62 determines whether the specific NE which received the WTR command is the fault detecting NE. If it is not, an operational step 64 transmits the WTR command on the same ring to the next NE and in the opposite direction from which it was received. Thus, FIG. 6e illustrates an example of the combination of steps 62 and 64 wherein NE5 receives the WTR command from the ring master. Since NE5 is not the fault detecting NE (rather, NE6 is the fault detecting NE), NE5 responds by forwarding the WTR command onward to ring 38.

Returning to conditional step 62 of FIG. 6a-1, if the NE receiving the WTR command is the fault detecting NE, then operational step 66 causes the NE to maintain its actual transport overhead break beyond the predetermined period discussed above in connection with operational step 48. As discussed in greater detail below, the fault detecting NE maintains its transport overhead break until it receives a command from the master NE authorizing or directing it to remove its transport overhead break. These maintenance and direction steps between the fault detecting NE and the ring master NE prohibit an instance wherein no overhead break exists along the ring. As stated above, such an instance is undesirable because it permits the opportunity for overhead to cumulatively feedback along the ring. Moreover, following operational step 66, note that ring network 34 is situated such that transport overhead communication is still possible between each NE along ring 34. As result, the transport overhead communication may be used to assist in troubleshooting or identifying the particular type of ring fault which has occurred. Ring 34 remains in this state until the master NE authorizes a change and the change is acted upon.

Operational step 68 of FIG. 6a-1 indicates the recognition by the fault detecting NE that the fault along the ring has been corrected. Such detection occurs when the NE receives a new command when it previously was receiving no signal. The time elapsed between steps 66 and 68 is necessarily determined by the time it takes to correct whatever fault occurred along the ring. Conditional step 70 determines whether the restoration of the ring signal has occurred before the expiration of the predetermined time period (i.e, ten seconds). If so, control returns to conditional block 68. This potential circular operation between steps 68 and 70 prevents the fault detecting NE from, in effect, toggling back and forth between an overhead break situation and a non-overhead break situation. In addition, as described above, the predetermined time period attempts to ensure that at least one overhead break is always inserted in the ring.

Continuing with conditional step 70, if the predetermined period has elapsed when the fault detecting NE detects the restored ring command, control passes to operational step 72. In step 72, the NE receiving the newly restored command acts in response to what the restored signal is directing. For example, if the new command is a no request command, the NE forwards a no request command along the repaired ring in the direction opposite from which the newly received command was received. FIG. 6f illustrates this occurrence for the current example. Specifically, NE6 detects the restoration of a command along ring 36 (note "X" has been removed indicating failure has been corrected). Because the predetermined time period has elapsed, NE6 forwards a no request (NR) command along ring 36 in the opposite direction from which it was received.

Note that the example above illustrates the instance wherein the newly corrected command is a no request command and, hence, it is passed onward in the opposite direction from which it is received. Other commands, however, could be received and acted upon as well. For example, if multiple failures occurred along the same ring, and were corrected at different times, an NE receiving a newly restored command could receive a signal failure command from a second NE prior to the receiving NE. In any instance, the receiving NE takes whatever action is necessary, and then transmits the responsive command onward in the direction opposite from which the original command was received.

The no request command from the fault detecting NE passes toward the ring master NE, but is received by any intermediate NEs between the fault detecting NE and the ring master NE. Conditional step 74 determines whether a specific NE receiving the newly responsive command is the master NE or is simply an intermediate NE. If the receiving NE is not the master, the process passes to operational step 75 wherein the newly restored command is acted on, and forwarded to the next NE. In the current example, therefore, and as shown in FIG. 6f, the no request command is forwarded by NE5 to the master NE.

Operational step 76 (FIG. 6a-2) takes place once the newly restored command reaches the master NE. In operational step 76, the master NE detects that it is no longer receiving a signal failure command. In response, the master NE reinserts its artificial transport overhead break. In operational step 78, the master NE sends a no request command back along the same ring in the direction from which it just received the new non-signal failure command. Thus, as shown in FIG. 6g, the ring master NE has reinserted its overhead break and transmitted a no request (NR) command back along ring 38 toward the fault detecting NE (i.e., NE6). Note also that two overhead breaks are currently in place (the second overhead break being maintained by NE6).

As shown in conditional step 80, any intermediate NE between the master NE and the fault detecting NE determines whether it is the fault detecting NE. If it is not, operational step 82 acts to forward the no request command onward in the opposite direction from which it was received and, hence, in the direction of the fault detecting NE. Thus, eventually the fault detecting NE receives the no request command in operational step 84. In step 84, the fault detecting NE determines that it is no longer receiving a wait to restore command. In response, and as shown in operational step 86, the fault detecting NE removes its actual transport overhead break. Moreover, it transmits onward the no request command in the opposite direction from which it was received. Thus, at this instance, the pictorial representation of ring 22 shown in FIG. 5b is once again re-established. Consequently, the ring transport overhead is fully restored for normal operations and the process returns to start step 42.

The process and steps discussed above exemplify the preferred method for detecting a signal failure along a ring and restoring some or all transport overhead in an organized and deterministic fashion. In addition to those steps, in the preferred embodiment, a novel incrementing and decrementing method is used to effect certain previously described functions. Specifically, with reference to FIG. 6a-1, recall that in operational step 50, the fault detecting NE transmits a signal failure command. In the preferred embodiment, the fault detecting NE transmits along with this signal failure command a count signal equal to one. Moreover, as this signal failure command passes through any intermediate NEs, each intermediate NE increments the accompanying count signal. Once the signal failure command reaches the master NE, it has an accompanying count which notifies the master of the distance, in NEs, from the master NE to the fault detecting NE. Thus, in the example of FIGS. 6b-6g, the master NE will receive a count of two along with the signal failure command. This count indicates that the fault detecting NE is two NEs away from the master NE in the direction from which the signal failure command was received.

The preferred method of the present invention also uses a novel decrementing scheme as well. Specifically, with reference to steps 56 and 60-64 of FIG. 6a-1, when the master NE transmits the WTR command, it also transmits an accompanying count equal to the count it previously received with the signal failure command. Further, as any intermediate NE receives the WTR command (as shown in step 60), the intermediate NE decrements the count and forwards it, along with WTR command, onward along the ring (see step 64). This decrementing method provides a mechanism for conditional step 62 to determine, for a given NE, whether the NE receiving the WTR is a fault detecting NE. Specifically, when an NE receives the WTR command, the NE determines that it is the fault detecting NE if the count is one. For example, referring to FIG. 6c, ring master NE0 originally sends out a count of two along with a WTR command along second ring 38. NE5 receives the WTR command and count of two as an intermediate NE. NE5 decrements the count to one and transmits it, along with the WTR command, onto ring 38 in the direction of NE6. NE6 receives the WTR command and the count of one. NE6 determines from the count of one that it is the fault detecting NE and, hence, the intended recipient of the WTR command. Accordingly, it may respond in the fashion described above in connection with operational step 66 and its subsequent steps.

The use of either an incrementing or a decrementing method provides numerous and similar advantages. For example, each NE along the ring does not require a specific address or knowledge of the ring map for purposes of accomplishing the transport overhead restoration process. Further, no specific hardware or software need be directed or expended in this regard. Moreover, if the ring is reconfigured, such as by the physical addition or removal of other intermediate NEs, no changes or additional addressing schemes or the like are necessary to effect the overhead restoration process. Further, and as set forth in connection with FIG. 5c, above, in the preferred embodiment, the K1 byte is used to provide for the count increment/decrement. SONET network rings already have appropriate mechanisms for decoding the K1 byte and, thus, no additional circuitry is necessary for implementing the count method of the present invention. Further, the K1 byte provides eight bits which are therefore capable of reaching 255 different NEs along a network ring. Thus, both the incrementing and decrementing scheme provide great flexibility over various size networks wherein the size of the network is subject to change.

FIG. 6h illustrates the ring timing message chart for the pictorial example shown in FIGS. 6b-6g, above, and described in connection with the flow chart of FIGS. 6a-1 and 6a-2. A brief discussion follows in connection with FIG. 6h for purposes of familiarizing the reader with the illustration of a ring timing message chart between the time of ring failure and the completion of ring restoration. Prior to time $t_1$, ring operation is normal and, hence, is illustrated as shown in FIG. 5c. At time $t_1$, however, NE6 detects a failure as shown in FIG. 6b along ring 36. In response, NE6 inserts an actual overhead ("OH") break in the direction of NE3. Moreover, NE6 transmits a signal failure command along ring 36 toward NE5. Thus, in FIG. 6h, the command from NE6 to NE5 is illustrated with the label "1".

As shown in the corresponding legend, for a label "1", the command is SF N#1. The "N#" designation is included for purposes of readability. The number following this designation is the decimal value of the binary count provided by the K1 byte. Thus, for the label "1", the command is "SF N#1", thereby indicating a signal failure command (i.e., "SF") with a K1 byte count equal to one (i.e., "N#1"). As another example, label "2" indicates a signal failure command (i.e., "SF") with a K1 byte count equal to two (i.e., "N#2"). Note also that a count is unnecessary for a no request command. Thus, for this command, no "N#" designation is provided and the K1 byte equals a binary zero.

Ring 38 is undisturbed by the failure and, therefore, a no request command is transmitted by NE6 toward NE3 along ring 38. Moreover, continuing from NE3 toward NE2 and NE4, it may be appreciated that the no request command continues along ring 38.

Returning to ring 36, the signal fail command is received by NE5 and its count is incremented as discussed above. As a result, NE5 send a command bearing the label of "2" to NE0. NE0, the master NE, receives the signal failure command. In response, the master NE transmits a wait to restore command with the corresponding count of two. As shown in FIG. 6h, this new command is transmitted to NE5 with the label "3". Label "3" corresponds to a WTR command with a count equal to two. Moreover, as set forth in connection with operational step 58 above, "closes" or removes its artificial overhead break. NE5 receives the signal failure command and decrements the count included therein. Consequently, FIG. 6h illustrates a command sent from NE5 to NE6 having the label "4". From the legend of FIG. 6h, the label "4" corresponds to a WTR command having a count of one.

NE6 recognizes the combination of the WTR signal and the count of one as an indication that it is the intended ultimate recipient of the WTR command. Consequently, NE6 continues to hold its overhead break beyond the predetermined period and transmits a no request command onward along ring 38. Note that the no request command continues to propagate around ring 38 until it reaches NE0. NE0 responds to this no request command by transmitting a no request command back in the direction from which it received the no request command, that is, back toward NE4 and along ring 36. Note also that the process from $t_1$ continues to repeat itself. Thus, as long as ring 36 is faulty, the last issued no request command from NE0 to NE4 along ring 36 does not reach NE6. NE6, therefore, transmits a signal failure command and the process re-commences until the fault on ring 36 is corrected.

At time $t_2$, the fault between NE3 and NE6 is repaired. Thus, NE6 detects a restoration of signal from ring 36. Specifically, the no request command (i.e., label "0") transmitted by NE0 along ring 36 reaches NE6. NE6 responds to the newly received command as appropriate. For a no request command, the response is simply to pass the command onward. Thus, NE6 passes onward the label "0" command along ring 36 to NE5. NE6 also receives a label "4" (i.e., wait to restore) command along ring 38. As was the case above, NE6 recognizes the wait to restore signal and continues to maintain its overhead break. In addition, NE6 transmits a label "0" (i.e., no request) command along ring 38 to NE3.

The label "0" command transmitted by NE6 along ring 36 is passed by NE5 to the master, NE0. The master NE detects the lack of a signal failure command (i.e., the no request command) and responds by inserting its artificial transport overhead break. In addition, NE0 transmits a no request command onto ring 38 toward the fault detecting NE which is maintaining its break (i.e., NE6). This no request command passes through NE5 and is received and detected by NE6. In response, NE6 "opens" or removes its actual transport overhead break and transmits a no request command onto ring 38 toward NE3. At this point, ring 36 and ring 38 are fully operational and the entire ring system is returned to a normal operating condition.

Figure 7A:
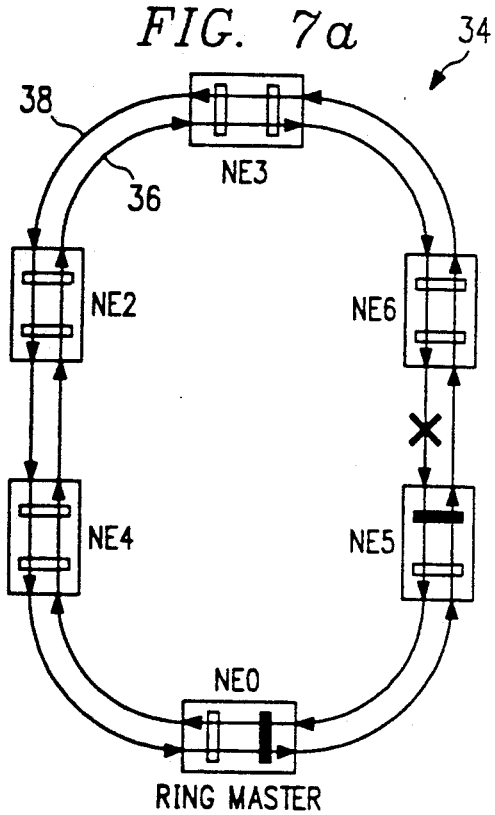
FIGS. 7a-b illustrate a pictorial and timing message chart representation, respectively, of the network ring of FIG. 5a wherein a fault is detected by an NI immediately adjacent the master NE.
Figure 7B:
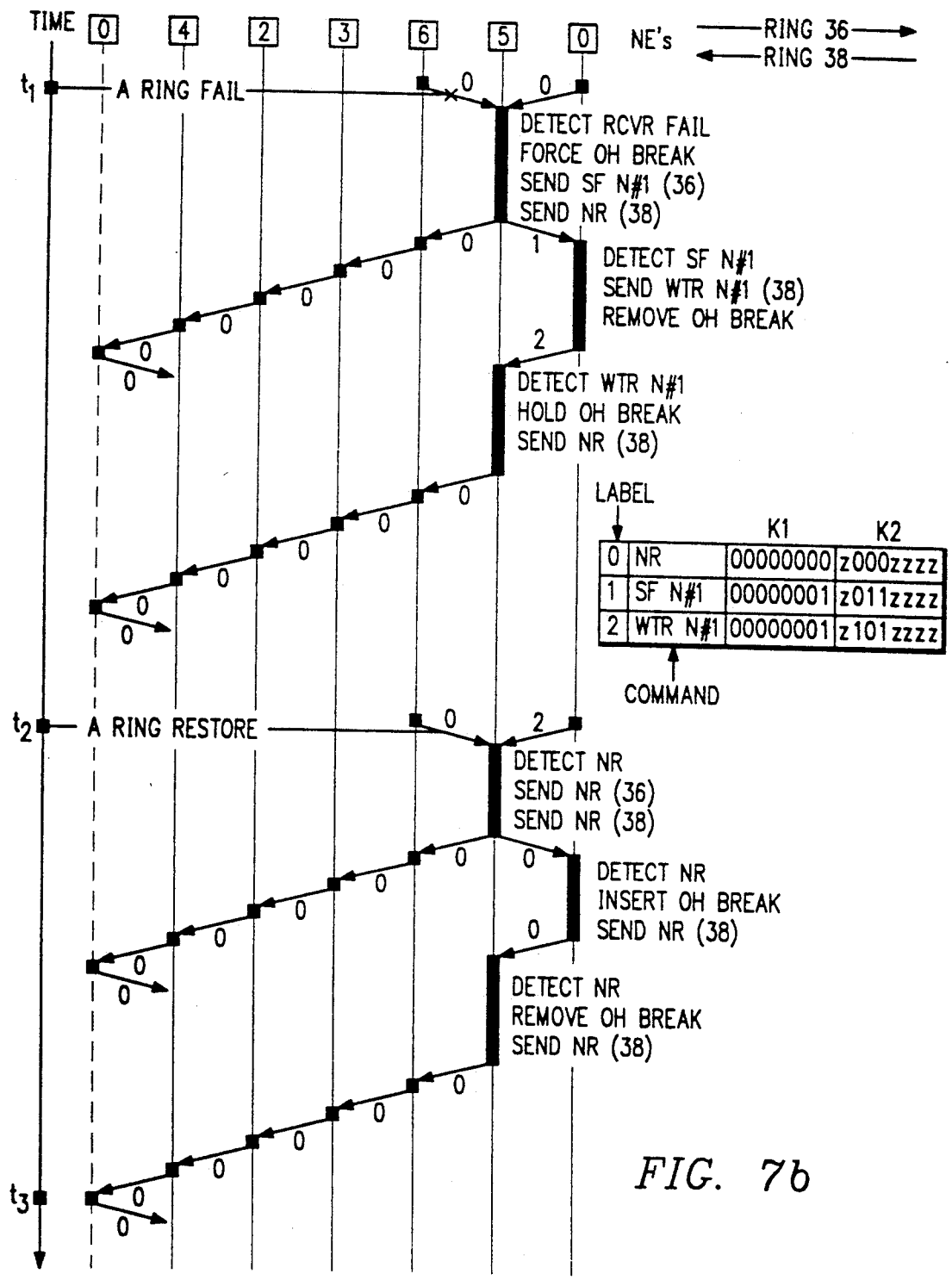

FIG. 7a illustrates a pictorial representation of a second example of the method and system of the present invention. Specifically, FIG. 7a illustrates ring network 34 wherein a fault has occurred along ring 36 between NE6 and NE5. Thus, the example illustrates a single break in ring system 34 which is detected by an NE immediately adjacent the ring master NE. With reference to the timing message chart of FIG. 7b, the ring fault occurs between NE6 and NE5 along ring 36 at time $t_1$. NE5 detects the ring failure (i.e., signal loss) and forces an actual transport overhead break between itself and NE6 along ring 36. In addition, NE5 transmits a signal failure command in the direction opposite from where the detected failure occurred and, hence, in the direction of ring master NE0 along ring 36. Thus, FIG. 7b illustrates the transmission from NE5 to NE0 of a label "1" signal which, as shown, corresponds to a signal failure command having a count equal to one. Moreover, NE5 transmits a legend "0" command (i.e., no request) to NE6 along ring 38.

NE0 receives the signal failure command from NE5 without it having passed through any intermediate NEs. As a result, the count provided along with the signal failure command is equal to one. NE0 detects the signal failure command and associated count and responds by sending a wait to restore command along with the count of one back toward NE5. Thus, a label "2" command is provided along ring 38 toward NE5. Moreover, NE0 continues to transmit a no request command along ring 36 toward NE4.

NE5 receives the wait to restore signal and the associated count of one from NE0. From this signal, NE5 determines that it is the intended ultimate recipient of the wait to restore command and, hence, maintains its actual transport overhead break in place, pending direction from the master NE that the break may be removed. Moreover, NE5 transmits a no request command toward NE6 along ring 36 and continuously transmits a signal failure command to NE0 along ring 36. These conditions continue until the fault between NE5 and NE6 along ring 36 is restored.

At time $t_2$, the fault between NE5 and NE6 along ring 36 is corrected. Consequently, NE5 receives a label "0" command from ring 36. This command is passed onward by NE5 to NE0. In addition, NE5 continues to transmit a label "0" command around ring 38. NE0 receives the label "0" command from NE5. As in the previous example with respect to FIG. 6h, NE0, as the master NE, detects the no request command and, hence, the lack of a signal failure command from the previously faulty ring 36. In response, NE0 reinserts its artificial transport overhead break. In addition, NE0 transmits a no request command back toward the same direction from which it received the no request command indicating restoration of communication along ring 36. Thus, a no request command is transmitted along ring 38 back toward NE5. NE5 receives the no request command and responds by removing its actual transport overhead break. In addition, NE5 forwards the no request command along ring 38 toward NE6, thereby fully restoring normal ring operating conditions.

Figure 8A:
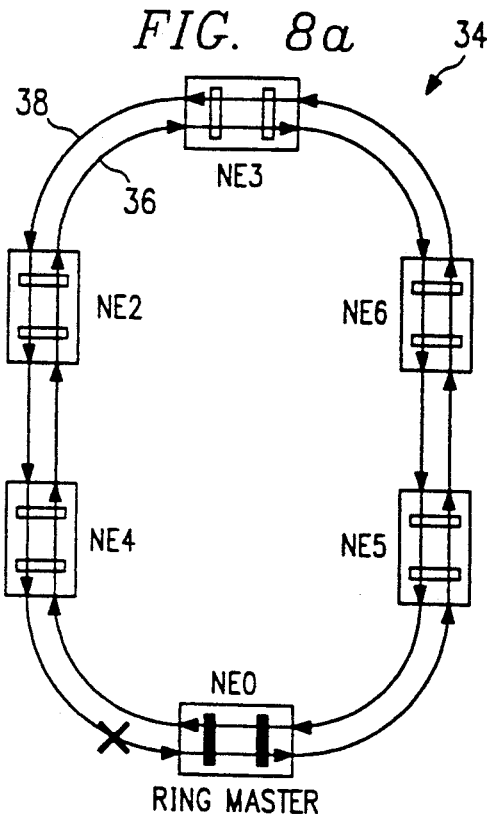
FIGS. 8a-b illustrate a pictorial and timing message chart representation, respectively, of the network ring of FIG. 5a wherein a fault is detected by the master NE.
Figure 8B:
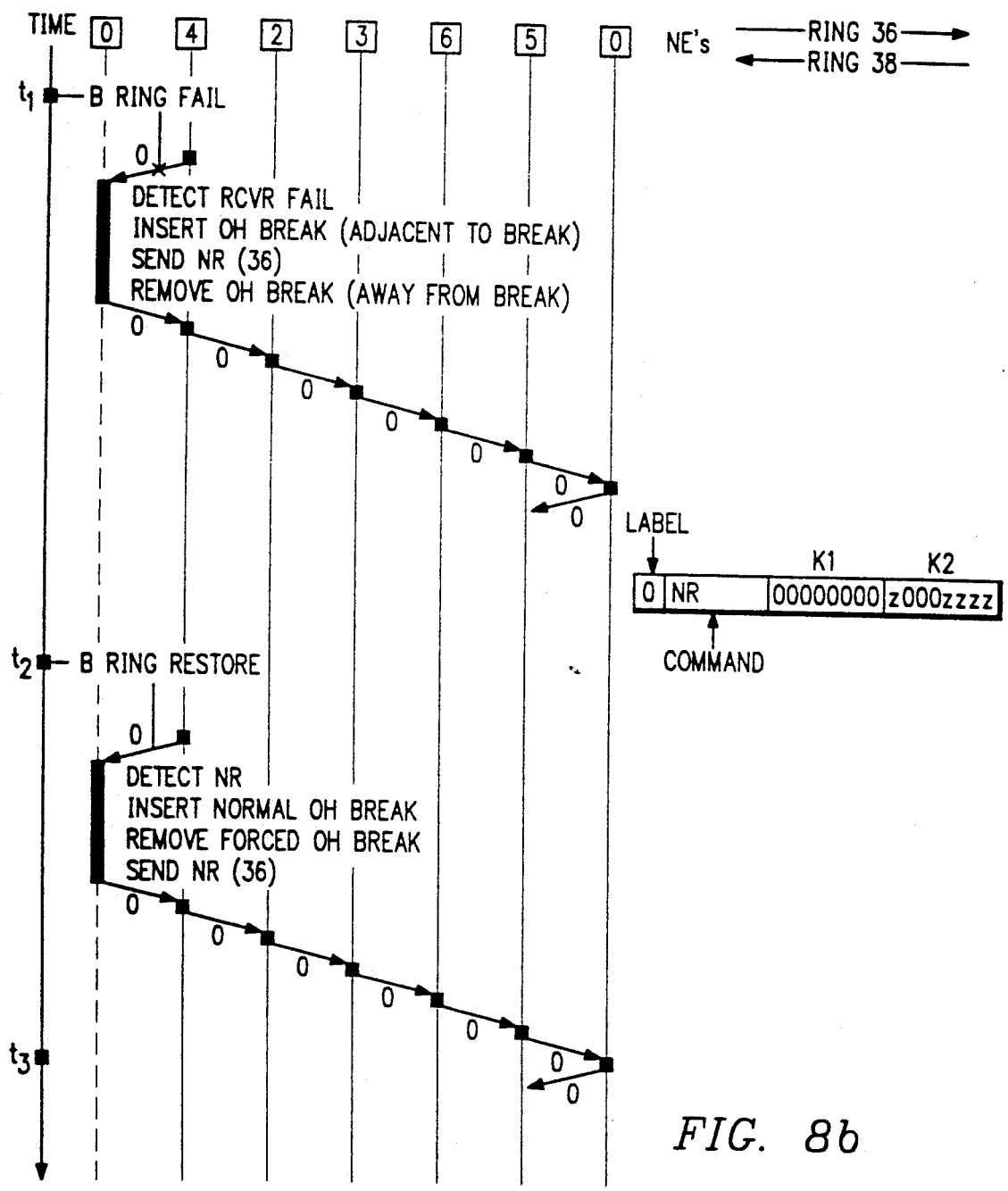

FIGS. 8a–b illustrate a pictorial and timing message chart representation, respectively, of an instance wherein a signal ring fault occurs immediately adjacent the ring master NE. In the example of FIG. 8a, a ring fault occurs between NE0 and NE4 along ring 38. As is the case for other NEs, the ring master NE detects the signal failure along ring 38. In response, NE0 inserts an actual transport overhead break on its side adjacent the failure. Because NE0 is the ring master, however, no signal failure command is transmitted. Moreover, because NE0 is the ring master, no wait to restore command is transmitted as well. Instead, ring master NE0 responds simply by transmitting a no request command back in the direction from which the failure occurred. Moreover, NE0 removes its artificial transport overhead break on its side opposing the failure in ring 38. Thus, the same resultant effect is created as in the previous examples, with the exception that there is no communication between a fault detecting NE independent of the master NE. The no request command from NE0 is forwarded through each subsequent NE around ring 36. Thereafter, NE0 also transmits a no request command along ring 38 to NE5. Note, however, that this latter no request command does not propagate entirely around ring 38 because the ring is severed between NE4 and NE0. This process continues until the failure along ring 38 is restored.

At a time $t_2$, the fault along ring 38 between NE4 and NE0 is corrected. Consequently, the command on ring 38 from NE4 to NE0 is restored. NE0 detects the restored command and responds by reinserting its artificial transport overhead break. Note that NE0 may reinsert its artificial break on either of its sides and, hence, need not reinsert it on the side which held the break prior to the fault detection. In addition, NE0 removes its actual transport overhead break which was previously inserted on the side adjacent the failure along ring 38. Finally, NE0 transmits a no request command in the direction from which the failure occurred and, hence, along ring 36. This no request command propagates through each of the NEs around ring 36, thereby restoring normal operations for the transport overhead along the ring.

Figure 9A:
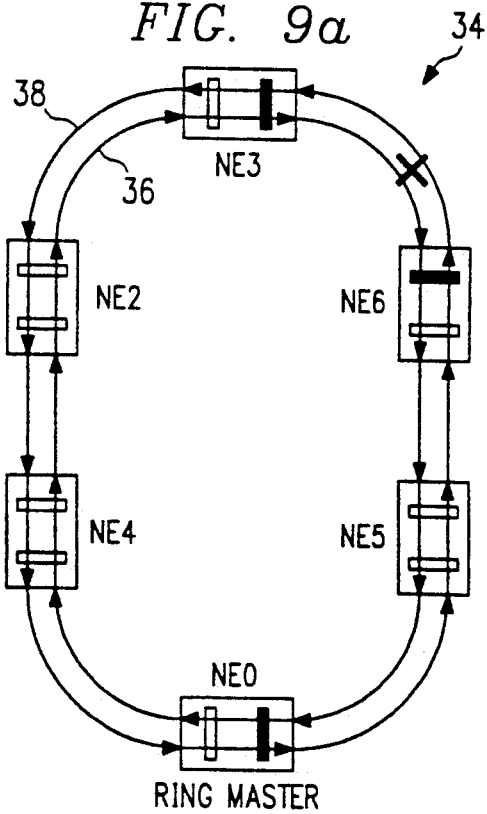
FIGS. 9a-b illustrate a pictorial and timing message chart representation, respectively, of the network ring of FIG. 5a wherein a fault (fiber break) across both ring of the ring network is detected.
Figure 9B:
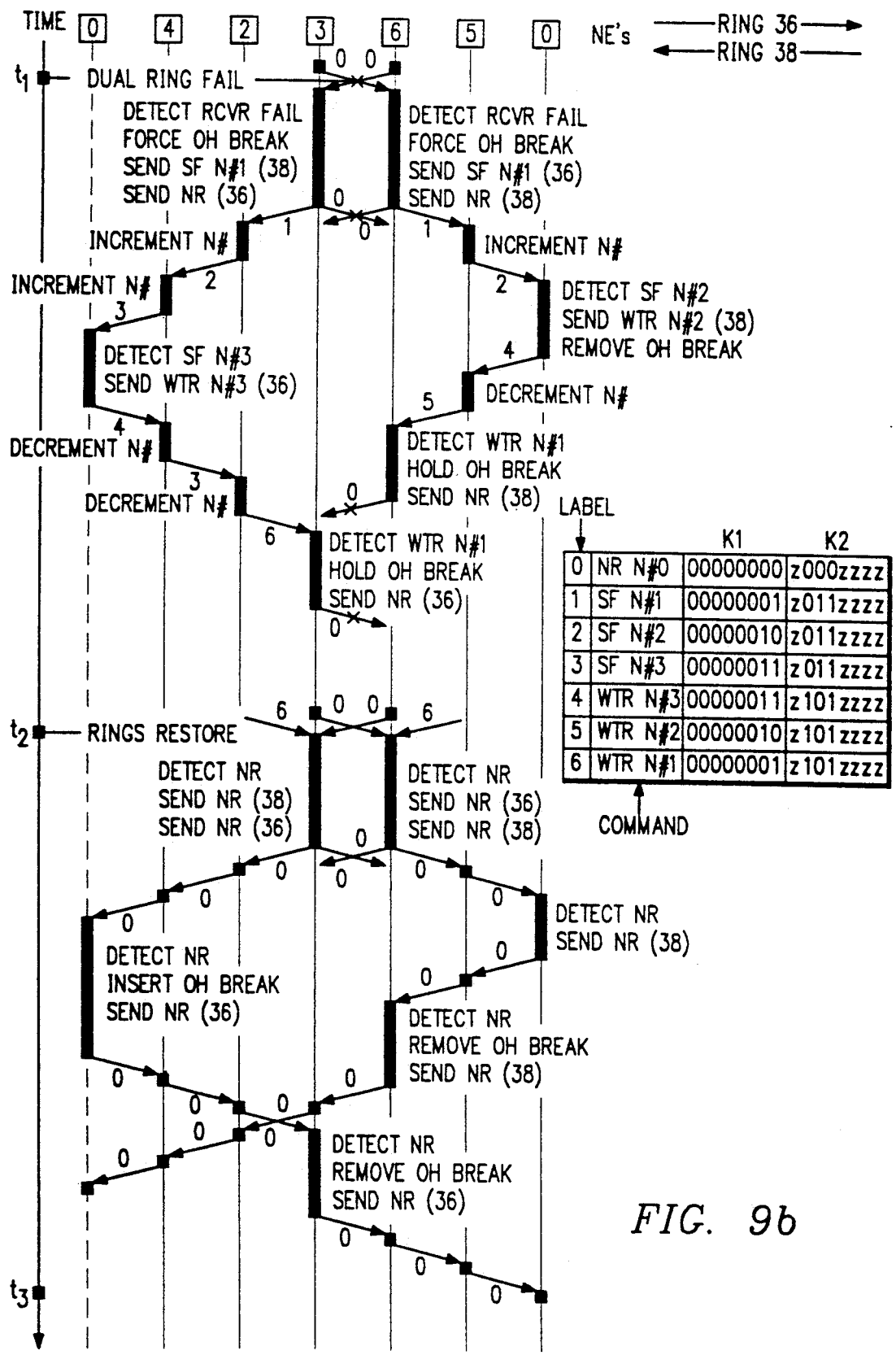

FIGS. 9a-b illustrate a pictorial representation and a timing message chart, respectively, for an example wherein both ring 36 and ring 38 are severed at the same time. Specifically, in the example illustrated in FIG. 9a, both rings 36 and 38 are severed between NE3 and NE6. Such an occurrence is possible in the instance where both rings 36 and 38 are disposed physically proximate one another and some type of device, such as a digging back hoe, inadvertently cuts through both rings. The inventive method and system of the present invention operate, even in this severe instance, to efficiently restore the transport overhead channels of the ring system.

With reference to FIG. 9b, the severance of rings 36 and 38 occurs at time $t_1$. Consequently, both NE3 and NE6 detect a signal failure. Each of these fault detecting NEs responds by inserting a transport overhead break on their sides immediately adjacent the detected failure. Further, each fault detecting NE responds by transmitting respective signal failure commands in the opposite direction from which the failure was detected. Accordingly, NE3 transmits a signal failure command with a count of one toward NE2 along ring 38. Likewise, NE6 transmits a signal failure command toward NE5 along ring 36. Both fault detecting NEs also attempt to transmit a no request command in the direction toward the detected failure. Thus, NE3 attempts to transmit a no request command to NE6 along ring 36, while NE6 attempts to transmit a no request command to NE3 along ring 38. Because rings 36 and 38 have been severed between NE3 and NE6, however, these attempts are unsuccessful.

Returning to the transmission along ring 38, NE2 receives the signal failure command having a count of one. NE2, as an intermediate NE, increments the count to two and transmits the signal failure command along with the incremented count to NE4 via ring 38. NE4 responds in a similar manner and, thus, increments the count accompanying the signal failure command to a count of three. This signal failure command with the incremented count is transmitted to NE0 via ring 38.

During the transmission of these signal failure commands and accompanying counts between NE3 and NE0 via ring 38, a similar process occurs between NE6 and NE0 via ring 36. Because NE6 is located closer to NE0 than NE3, however, the latter's signal failure command arrives sooner than the former's. Specifically, NE6, after inserting a transport overhead break, transmits a signal failure command with a count of one to NE5 via ring 36. NE5 increments the count and forwards it along with its accompanying signal failure command to NE0 via ring 36. Thus, where both rings are concurrently severed, concurrent signal failure commands are sent on both rings to the master NE.

The master NE responds differently to the signal failure commands received from NE6 and NE3. Specifically, NE0 removes its overhead break in response to the first signal failure command it receives. Thus, NE0 removes its artificial overhead break in response to the signal failure command originally transmitted from NE6. In the preferred embodiment, this feature is implemented in software using a logical OR function. Specifically, software for the master NE performs a logical OR for signal failure commands arriving at either side of the master NE. Thus, if either the left side or the right side of the master NE receives a signal failure command, then the master responds by removing its artificial transport overhead break. In addition, as was the process in the examples above, NE0 transmits a wait to restore command back toward the fault detecting NE along with an accompanying count equal to the count level received with the signal failure command. Thus, in the current example, NE0 transmits a wait to restore signal with a accompanying count equal to two to NE5 via ring 38.

NE5, as an intermediate NE, decrements the count and forwards it, along with its accompanying wait to restore command, to NE6 via ring 38. NE6 receives the wait to restore command and detects that its accompanying count is equal to one. As stated above, this combination of command and count causes the receiving NE to maintain its transport overhead break and to forward onward a no request command in the opposite direction from which the wait to restore command was received. In the current example, this action causes NE6 to attempt to transmit a no request command via ring 38 to NE3. Because ring 38 has been severed between NE6 and NE3, however, this attempt is unsuccessful.

Note that NE0 also responds to the signal failure command it receives from NE4 along ring 38. Because NE0 has already removed its artificial transport overhead break, however, it need not do so a second time. Thus, NE0 responds to the signal failure command only by transmitting a wait to restore command with an accompanying count equal to that of the count which it received accompanying the signal failure command. In the example of FIG. 9b, NE0 transmits a wait to restore command having a count equal to three to NE4 via ring 36. NE4, as well as NE2, act as intermediate NEs. Therefore, each NE receives the wait to restore signal, decrements its accompanying count, and forwards it onward in the opposite direction from which it was received. As a result, NE3 receives a wait to restore command having a count of one. In response, NE3 maintains its transport overhead break and attempts to send a no request command in the direction opposite from which it received the wait to restore command. Again, this attempt fails because NE3 is attempting to communicate to NE6 via ring 36 which has been severed. Following the above steps, the ring continues these steps until the severance between NE3 and NE6 is corrected.

At time $t_2$, the severance of both rings 36 and 38 is corrected. Consequently, NE3 receives a no request command transmitted by NE6 via ring 38 (as well as a wait to restore command which was transmitted via ring 36 from NE0). Similarly, NE6 receives a no request command from NE3 via ring 36 (as well as a wait to restore command via ring 38 and transmitted by NE0). In response, NE6 no longer transmits a signal failure command toward NE0, but instead transmits a no request command via ring 36 to NE5. NE5 forwards this no request command via ring 36 to NE0. Concurrently with this transmission along ring 36, NE3 transmits, in a like manner, a no request command to NE2 via ring 38. This no request command is communicated along ring 38, through NE2 and NE4, to NE0. Note, therefore, that the no request commands are concurrently transmitted along rings 36 and 38 toward NE0.

In the example illustrated, the no request command along ring 36 reaches NE0 prior to the no request command along ring 38. NE0 responds to the first receipt of a no request command simply by transmitting its own no request command back in the same direction from which the no request command was received. Thus, a no request command is transmitted by NE0 to NE5 via ring 38. Conversely, however, upon receiving the second no request command via ring 38 from NE4, NE0 responds by reinserting its artificial transport overhead break and then transmitting a no request command toward the direction from which the second no request was received. Thus, NE0 transmits a no request command via ring 38 to NE4. In the preferred embodiment, the ability of NE0 to respond to the secondly received no request command also operates in response to the software OR function described above. Particularly, the master NE keeps its overhead break removed if either of its sides are receiving a signal failure command. Thus, to reinsert its overhead break, the master must not be receiving a signal failure command at either side. Accordingly, when the first signal failure command in the current example (i.e., from NE5) stops arriving, the master is still receiving the signal failure command on its opposing side (i.e., from NE4). As such, the master does not yet reinsert its artificial transport overhead break. Only when the second signal failure command stops (i.e., when the second no request command arrives) does the master reinsert its overhead break.

Returning to NE5, it receives the no request command from NE0 and forwards it via ring 38 to NE6. NE6, therefore, is no longer commanded to wait to restore its overhead break and, therefore, removes its overhead break. NE6 also transmits a no request command onward via ring 38 to NE3, and so forth. Returning to NE4, it receives the no request command from NE0 and forwards it to NE2, which forwards it to NE3. NE3, like NE6, detects the lack of a wait to restore signal and, therefore, removes its overhead break as well. Further, NE6 transmits onward the no request command received from NE2 and, hence, ring 34 is fully restored to its normal operating condition. Note that the example of FIGS. 9a-b illustrates the independence of the restoration for the two rings under the present invention. Thus, a fault on one ring may be properly detected and responded to without depending on a previous restoration of the other.

Figure 10A:
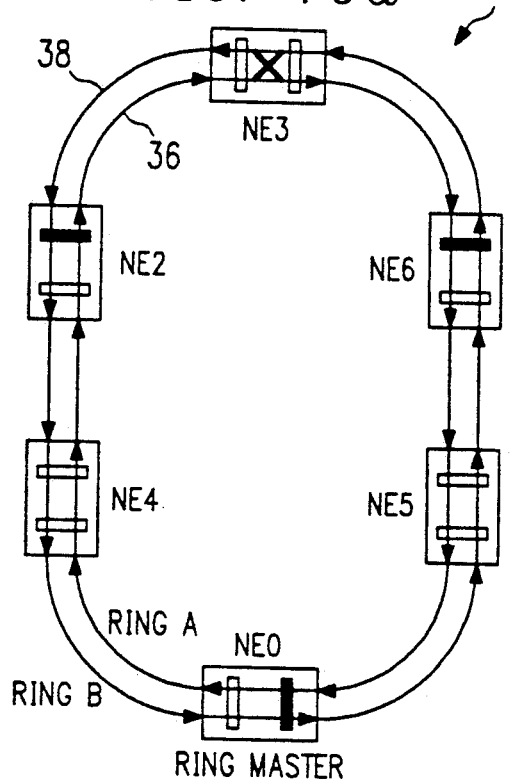
FIGS. 10a-b illustrate a pictorial and timing message chart representation, respectively, of the network ring of FIG. 5a wherein a fault (node failure) occurs in an NE.
Figure 10B:
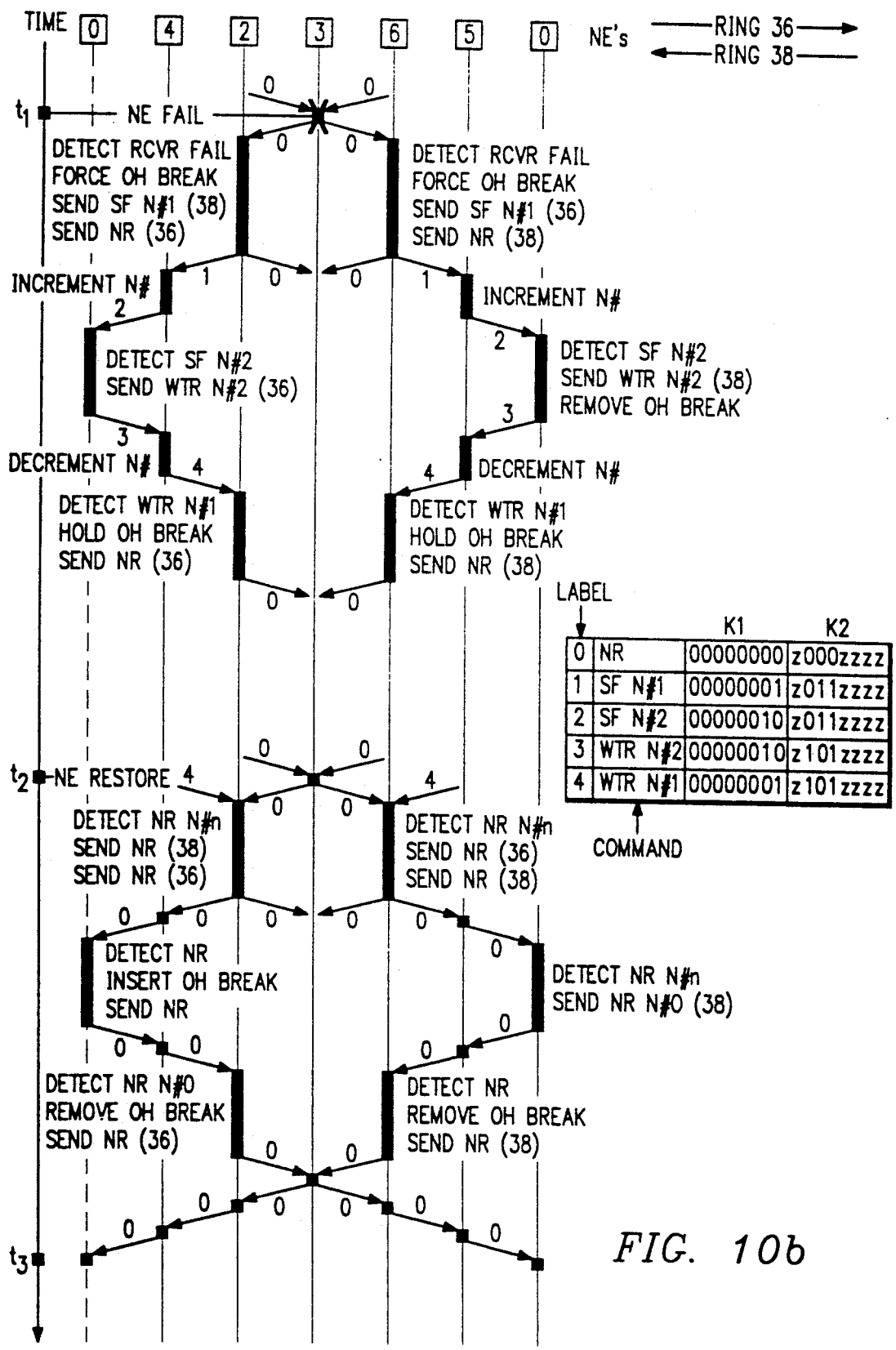

FIGS. 10a-b illustrate a pictorial representation and timing message chart, respectively, of an instance wherein an NE fails (i.e., node failure), rather than the communications medium between two NEs. The example in FIG. 10a illustrates a failure in NE3. Moreover, the example illustrates an instance wherein the failure is symmetric with respect to the ring master, that is, there are an identical number of intermediate NEs on both sides of the failure relative to the master NE.

With reference to FIG. 10b, the failure within NE3 occurs at time $t_1$. Accordingly, NE2 and NE6 respond in like manners, but in opposing directions along ring 38 and 36, respectively. Specifically, NE2 detects the loss of signal along ring 38 and transmits a signal failure command with a count of one toward NE4 along ring 38. NE4, as an intermediate NE, increments the count and transmits it along with the signal failure command to NE0 along ring 38. In a symmetric fashion, NE6 and NE5 operate in the same manner as NE2 and NE4, respectively. Thus, a signal failure command with a count of two is received by NE0 along ring 36.

In a manner similar to that discussed in connection with FIG. 9b, NE0 responds to the two different signal failure commands in accordance with the order in which they are received. In the example of FIG. 10b, it is assumed that NE0 receives the signal failure command from NE5 before it receives the similar command from NE4. For the first signal failure command received, NE0 transmits a wait to restore command with the corresponding count back in the direction from which the signal failure command was received, and also removes its artificial transport overhead break. As to the second failure command signal received by NE0 (i.e., from NE4), NE0 responds only by returning a wait to restore command with the accompanying count of two back to NE4 along ring 36.

The wait to restore commands transmitted along both ring 36 and ring 38 from NE0 propagate through each intermediate NE until they reach their respective fault detecting NEs (i.e., NE2 and NE6). Once received, each fault detecting NE operates in the same manner as is set forth in the many examples above, namely, by detecting the wait to restore command with a one count and maintaining their respective actual transport overhead breaks.

At time $t_2$, the fault within NE3 is corrected. Consequently, and again in symmetric fashion, NE2 and NE6 detect a command received from the corrected failure on the ring. Thus, NE2 receives a no request command along ring 38 and NE6 receives a no request command along ring 36. In response, each detecting NE transmits the no request command onward in a direction opposition from which it was received. Thus, NE2 transmits a no request command via ring 38 to NE4. Similarly, NE6 transmits a no request command via ring 36 to NE5. These transmitted no request commands again "race" to NE0 via their respective rings.

In receiving the respective no request commands, NE0 operates in a manner similar to that discussed in connection with the ring restoration in FIG. 9b; that is, by returning a no request command in response to the first no request received, and inserting an artificial overhead break and returning a no request command in response to the second no request command received. In the example of FIG. 10b, it is assumed that NE0 receives the no request along ring 36 before the no request signal along ring 38. Accordingly, NE0 first responds by transmitting a no request command via ring 38 back toward NE5. In contrast, in response to the secondly received no request command via ring 38, NE0 inserts its artificial overhead break and transmits a no request command back in the direction from which the no request command was received, that is, along ring 36 to NE4. The symmetric no request commands transmitted by NE0 again traverse the intermediate NEs until reaching the original fault detecting NEs. Each fault detecting NEs detects the lack of a wait to restore command, removes its respective overhead break and transmits onward a new request command.

Figure 11A:
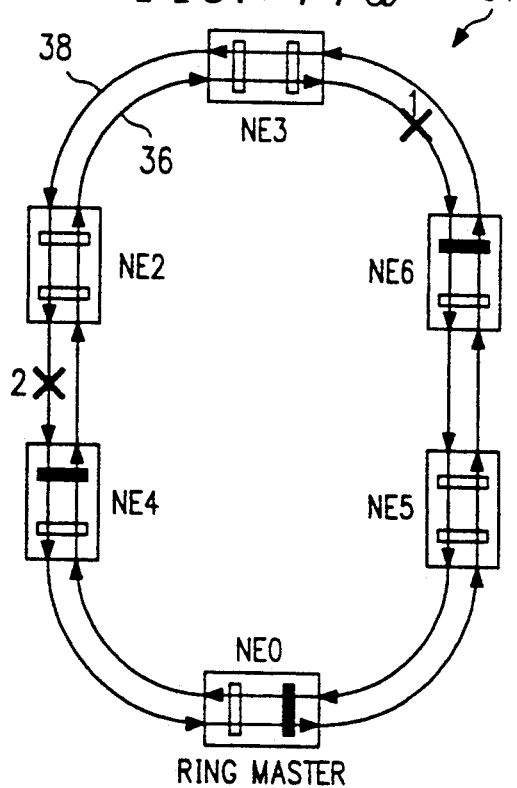
FIGS. 11a-b illustrate a pictorial and timing message chart representation, respectively, of the network ring of FIG. 5a wherein independent faults (fiber failures) occur at separate locations along the independent rings.
Figure 11B:
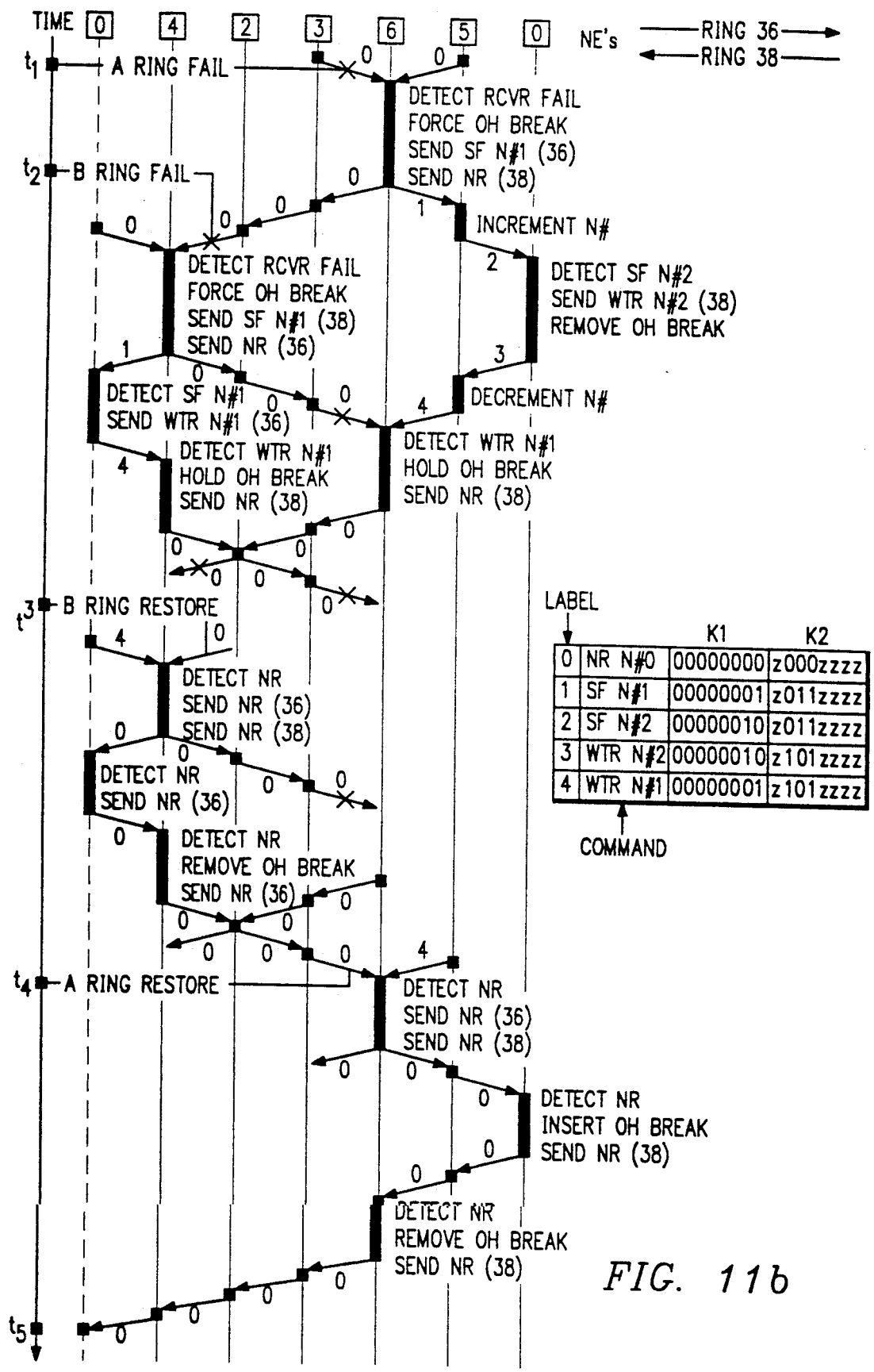

FIGS. 11a-b illustrate a pictorial representation and timing message chart, respectively, of an instance wherein two independent faults occur along rings 36 and 38, respectively. In the example illustrated, a first fault occurs along ring 36 between NE3 and NE6. Thereafter, a second fault occurs along ring 38 between NE2 and NE4. As shown by the following discussion of FIG. 11b, this example produces a segmented transport overhead network over a certain period of time, that is, one set of NEs are separated from communicating transport overhead with a second set of NEs during this time. Nevertheless, the inventive method and system of the present invention provide for a stable and fail safe restoration of the network to its original operating condition as the network failures are repaired.

With reference to FIG. 11b, the first failure at ring 36 between NE3 and NE6 occurs at time $t_1$. In response, NE6 transmits a signal failure command with a count of one via ring 36 to NE5. This command is received by NE5, which increments the associated count and forwards the incremented count along with the signal failure command to NE0. NE0 responds in the same manner as discussed in numerous examples above and, hence, transmits a wait to restore command with a count of two back in the direction from which it received the signal failure command, and also removes its transport overhead break.

Returning to NE6, it continues to transmit in an ordinary fashion along ring 38. Thus, NE6 transmits the appropriate signal, which in this instance is a no request command, via ring 38 to NE3. NE3 also forwards this command onward to NE2. NE2 attempts to forward this signal to NE4, but fails to do so because at time $t_2$, a failure occurs in ring 38 between NE2 and NE4. The second failure causes the method and system of the present invention to commence a second time with NE4. NE4 detects a loss of signal and responds by sending a signal failure command in the direction opposite the failure, that is, via ring 38 to NE0. Moreover, NE4 continues to operate in an ordinary fashion along ring 36 and, hence, transmits a no request command thereon. The signal failure command with a count of one is received by NE0 along ring 38. Because NE0 has previously removed its overhead break due to the failure in ring 36, it responds to this second signal failure command simply by returning a wait to restore command with a corresponding count of one. This wait to restore command is detected by NE4 which maintains its overhead break until not authorized by the master NE to remove the break. Moreover, NE4 transmits a no request command onward via ring 36 to NE2.

In the meantime, returning to NE6, a wait to restore command along with an accompanying count has been transmitted from NE0 toward NE6. NE6 receives this command along with its count of one, which has been decremented by NE5 from a count of two. NE6 responds by maintaining its overhead break until directed by the master NE to remove it. At this point, note that NE2 and NE3 are unable to communicate transport overhead to the remainder of the NEs on network ring 34. While this temporary result is not desirable, the present invention operates to restore transport overhead communication as soon as either of the two ring faults are cured. Moreover, the process of restoration is highly predictable and reliable, even in this dual-fault example.

At time $t_3$, the failure along ring 38 between NE2 and NE4 is corrected. NE4 detects a newly incoming no request command from NE2 and responds by transmitting a no request command in the direction opposite from which the no request command was received. Therefore, a no request command is transmitted via ring 38 to NE0. NE0 detects the lack of a signal failure command, but does not reinsert its overhead break because of the second failure along the ring (and, hence, the second signal failure command being received by NE0). Specifically, NE0 responds only by returning a no request command to the direction from which the no request was received. Thus, a no request command is transmitted via ring 36 to NE4. NE4 receives the no request command and removes its overhead break. NE4 also forwards a no request command onward via ring 36 to NE2. Note also, at this point, each of the NEs is again able to communicate transport overhead with one another.

At a time $t_4$, the failure along ring 36 between NE3 and NE6 is restored. Consequently, NE6 detects the newly arriving no request command from NE3 and responds by transmitting it via ring 36 to NE5. NE5 forwards the no request command to NE0. Upon detecting the no request command, NE0 reinserts its artificial transport overhead break and transmits a no request command back in the direction from which the no request command was received. The transmitted no request command reaches NE6 which responds by removing its overhead break and forwarding a no request command onward onto ring 38.

From the above, one skilled in the art may appreciate the objects and benefits of the present invention. Further, while the preferred embodiment has been illustrated in connection with a unidirectional ring, the present invention need not necessarily be limited thereto. Specifically, the invention would provide additional advantages and benefits if used in a bidirectional ring. A bidirectional ring is a ring in which all nodes send (without a permanent head end bridge) and receive duplex traffic by traversing the same set of nodes for both directions of transmission under normal conditions. Thus, if traffic from a first node to a second node is travelling clockwise, the traffic from the second node to the first node travels counterclockwise. Currently, specifications provide two different alternatives for restoring traffic for a bidirectional ring. As to overhead, however, the restoration process is not defined. Accordingly, the same inventive principles discussed above could be implemented in a bidirectional ring as well. Note, however, that under current SONET bidirectional ring standards, the K1 and K2 bytes are specifically defined for use in overhead operations. Thus, a person having ordinary skill in the art would select other bits or bytes to transmit the commands discussed above for purposes of restoring overhead along the ring. In addition, an additional byte or group of bits could be selected to implement the novel and beneficial counting scheme also described above.

In addition, from the numerous example above, it should be appreciated that the present invention provides a highly efficient and deterministic process for restoring transport overhead operations on a ring network following a failure or multiple failures along the ring network. The restoration process occurs without delaying or affecting traffic protection along the ring. In addition, the NEs along the ring do not require network topology information other than the type of ring (i.e., unidirectional or bidirectional) and no specific node must be designated as a master NE. As yet another advantage, additional need for node specific software is eliminated. Moreover, when the K1 byte is used for purposes of implementing the inventive counting scheme, a large number of NEs (i.e., $2^8 - 1 = 255$) may be supported. Still further, while the invention has been described herein relative to its preferred embodiment, it is, of course, contemplated that modifications of and alternatives to this embodiment will be apparent to those of ordinary skill in the art having reference to the specification and its drawings. For example, the present invention has been described in connection with ring networks including fiber optic rings. Such description is only by way of example and, thus, the invention is beneficial for use with other communications media as well. As another example, a single byte could be used to encode both the message and the count scheme described above. As yet another example, in a bidirectional ring, the command and count could be included in a DCC message packet between NEs. It is contemplated that other modifications and alternatives are likewise within the scope of this invention as defined by the following claims.

What is claimed is:

1. A method of restoring transport overhead along a ring network having a plurality of network elements communicating a signal on said ring network, comprising:
    designating a first of said plurality of network elements as a master network element;
    inserting a first transport overhead break on said ring network by said master network element;
    detecting a signal failure of said signal by a second of said plurality of network elements;
    inserting a second transport overhead break on said ring network by said second network element in response to said step of detecting a signal failure; and
    removing said second transport overhead break by said second network element under the direction of said master network element.

2. The method of claim 1 and further comprising:
    notifying said master network element of said signal failure by said second network element; and
    removing said first transport overhead break by said master network element in response to said notifying step.

3. The method of claim 2 and further comprising:
    detecting a restoration of said signal by said second network element, said second network element notifying said master network element of said restoration of said signal; and
    inserting a third transport overhead break on said ring network by said master network element in response to said notification from said second network element of said restoration of said signal.

4. The method of claim 1 wherein said ring network comprises a unidirectional ring network.

5. The method of claim 1 and further comprising maintaining said second transport overhead break for a predetermined period of time, wherein said step of removing said second transport overhead break is permitted to occur only after expiration of said predetermined period of time.

6. A method of restoring transport overhead along a ring network having a plurality of network elements communicating a signal on said ring network, comprising:
    designating a first of said plurality of network elements as a master network element;
    detecting a failure of said signal by a second of said plurality of network elements;
    transmitting a count to said master network element by said second network element in response to said step of detecting a failure; and
    receiving said count by said master network element.

7. The method of claim 6 and further comprising incrementing said count each time said count passes through one of said plurality of network elements other than said first and second network elements.

8. The method of claim 6 and further comprising transmitting a signal failure command with said count.

9. The method of claim 6 wherein said master network element is maintaining a transport overhead break, and further comprising removing said transport overhead break in response to receiving said signal failure command with said count.

10. The method of claim 6 wherein said count comprises a first count, and further comprising:
    transmitting a second count on said ring network by said master network element to said second network element; and
    receiving said count by said second network element.

11. The method of claim 10 and further comprising decrementing said second count each time said second count passes through one of said plurality of network elements other than said master and said second network elements.

12. The method of claim 10 and further comprising transmitting a wait to restore command with said second count.

13. The method of claim 12 wherein said second network element is maintaining a transport overhead break, and further comprising removing said transport overhead break in response to detecting the lack of said wait to restore command.

14. The method of claim 10 wherein said ring network comprises a unidirectional ring having K1 and K2 transport overhead bytes, and wherein said K1 byte comprises said first and second counts and wherein said K2 byte comprises said signal failure and wait to restore commands.

15. A method of restoring transport overhead along a ring network having a plurality of network elements communicating a signal on said ring network, comprising:
    detecting a failure of said signal by one of said plurality of network elements;
    initially restoring traffic along said ring network via software communication between said plurality of network elements; and
    initially restoring transport overhead along said ring network via software communication between said plurality of network elements.

16. The method of claim 15 wherein step of secondarily restoring transport overhead comprises:
    maintaining a first transport overhead break by a first of said plurality of network elements;
    inserting a second transport overhead break by a second of said plurality of network elements in response to said step of detecting a failure; and
    removing said first transport overhead break such that each of said plurality of network elements may communicate transport overhead with one another despite said detected failure.

17. A method of restoring transport overhead along a ring network having a plurality of network elements communicating a signal on said ring network, comprising:
    maintaining a first transport overhead break by a first of said plurality of network elements;
    detecting a failure of said signal by a second of said plurality of network elements;

inserting a second transport overhead break on said ring network by said second network element in response to said step of detecting a failure;
reinserting said first transport overhead break after said step of inserting a second transport overhead break; and
removing said second transport overhead break by said second network element after said step of reinserting said first transport overhead break.

* * * * *